(12) United States Patent
Yang et al.

(10) Patent No.: US 11,956,083 B2
(45) Date of Patent: Apr. 9, 2024

(54) COMMUNICATION METHOD AND APPARATUS FOR RETRANSMITTING MPDUS WITH DIFFERENT RVS

(71) Applicant: HUAWEI TECHNOLOGIES CO., LTD., Shenzhen (CN)

(72) Inventors: Mao Yang, Xi'an (CN); Jian Yu, Shenzhen (CN); Bo Li, Xi'an (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 76 days.

(21) Appl. No.: 17/519,951

(22) Filed: Nov. 5, 2021

(65) Prior Publication Data

US 2022/0060291 A1    Feb. 24, 2022

Related U.S. Application Data

(63) Continuation of application No. PCT/CN2020/088826, filed on May 6, 2020.

(30) Foreign Application Priority Data

May 8, 2019  (CN) .......................... 201910381307.3

(51) Int. Cl.
  *H04L 1/1812*  (2023.01)
  *H04L 1/1829*  (2023.01)
  *H04W 28/04*  (2009.01)
(52) U.S. Cl.
  CPC .......... *H04L 1/1858* (2013.01); *H04L 1/1816* (2013.01); *H04W 28/04* (2013.01)
(58) Field of Classification Search
  CPC .................................................... H04L 1/1819
  See application file for complete search history.

(56) References Cited

U.S. PATENT DOCUMENTS

| 2005/0141560 A1* | 6/2005 | Muthiah | ................. H04L 47/24 370/395.21 |
| 2005/0220145 A1* | 10/2005 | Nishibayashi | ........ H04W 99/00 370/474 |

(Continued)

FOREIGN PATENT DOCUMENTS

| CN | 103119881 A | 5/2013 |
| CN | 106161583 A | 11/2016 |

(Continued)

OTHER PUBLICATIONS

Shi Shuo, The Study of Retransmission Mechanism of Hybrid Automatic Repeat Request (HARQ) in the System of TD-LTE, 2011, with an English Abstract, total 78 pages.

(Continued)

*Primary Examiner* — Benjamin Lamont
(74) *Attorney, Agent, or Firm* — Rimon PC

(57) ABSTRACT

This application provides a communication method and apparatus that allow retransmitted MPDUs with different retransmission versions (RVs) to be transmitted in a same transmission process. The communication method and apparatus may be applied to a data retransmission process between any two nodes in a Wi-Fi system. In the method, when a PPDU sent by a first node includes one or more retransmitted MPDUs, the first node may include RV indication information in the PPDU to indicate an RV of each retransmitted MPDU, so that a second node can properly receive each retransmitted MPDU based on the RV indication information.

18 Claims, 25 Drawing Sheets

(56) References Cited

U.S. PATENT DOCUMENTS

| | | | |
|---|---|---|---|
| 2005/0249222 A1* | 11/2005 | van Kampen | H04L 69/04 370/395.5 |
| 2007/0242745 A1* | 10/2007 | Choi | H04B 3/54 375/240 |
| 2012/0084616 A1* | 4/2012 | Wentink | H04L 1/1825 714/E11.131 |
| 2014/0126551 A1* | 5/2014 | Nammi | H04L 1/1819 370/336 |
| 2016/0365952 A1* | 12/2016 | Kim | H04L 1/1816 |
| 2017/0126363 A1 | 5/2017 | Wang et al. | |
| 2017/0208627 A1 | 7/2017 | You et al. | |
| 2017/0230136 A1* | 8/2017 | Yan | H04L 1/0025 |
| 2017/0230149 A1* | 8/2017 | Wang | H04L 1/1614 |
| 2018/0069663 A1* | 3/2018 | Du | H04L 1/1864 |
| 2018/0375621 A1* | 12/2018 | Turtinen | H04L 1/0003 |
| 2019/0103951 A1 | 4/2019 | Park et al. | |
| 2019/0140787 A1* | 5/2019 | Kim | H04L 1/1874 |
| 2019/0327761 A1* | 10/2019 | Suzuki | H04W 28/04 |
| 2020/0244395 A1* | 7/2020 | Sun | H04L 1/1896 |
| 2020/0389814 A1* | 12/2020 | Zhang | H04W 28/06 |
| 2021/0014006 A1* | 1/2021 | Duan | H04L 1/1812 |
| 2022/0116149 A1* | 4/2022 | Yang | H04L 1/0008 |

FOREIGN PATENT DOCUMENTS

| | | |
|---|---|---|
| CN | 106712909 A | 5/2017 |
| CN | 107078790 B | 9/2019 |
| CN | 110417518 A | 11/2019 |
| CN | 111431672 A | 7/2020 |
| CN | 112217611 A | 1/2021 |
| EP | 3203666 A1 | 8/2017 |
| TW | 201519596 A | 5/2015 |
| WO | 2019028774 A1 | 2/2019 |
| WO | 2019205803 A1 | 10/2019 |

OTHER PUBLICATIONS

Doc.: IEEE 802.11-18/1979r1, Tianyu Wu et al., HARQ performance analysis, Jan. 2019, total 11 pages.

IEEE Std 802.11tm-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.

* cited by examiner

COMMUNICATION METHOD AND APPARATUS FOR RETRANSMITTING MPDUS WITH DIFFERENT RVS

CROSS-REFERENCE TO RELATED APPLICATIONS

This application is a continuation of International Application No. PCT/CN2020/088826, filed on May 6, 2020, which claims priority to Chinese Patent Application No. 201910381307.3, filed on May 8, 2019. The disclosures of the aforementioned applications are hereby incorporated by reference in their entireties.

TECHNICAL FIELD

This application relates to the communication field, and in particular, to a communication method and apparatus.

BACKGROUND

In a current wireless fidelity (Wi-Fi) system, when data is incorrectly transmitted, a first node needs to retransmit different redundancy versions (RVs) of the incorrect data, so that a second node decodes two redundancy versions of the two transmissions in a combining manner, to improve a decoding success rate.

However, when a plurality of pieces of data need to be transmitted in one transmission process, it is required that all the plurality of pieces of data have a same redundancy version, or all the plurality of pieces of data be newly transmitted data. It is easily understood that, when the plurality of pieces of data include both newly transmitted data and retransmitted data, and/or the plurality of pieces of data include a plurality of pieces of retransmitted data with different redundancy versions, the first node needs to initiate a plurality of transmissions to complete transmissions of the plurality of pieces of data. This increases scheduling complexity of data transmission. As a result, data transmission efficiency is low.

SUMMARY

Embodiments of this application provide a communication method and apparatus, to resolve a problem that retransmitted MPDUs with different RVs cannot be transmitted in a same transmission process, and improve data transmission efficiency.

To achieve the foregoing objective, the following technical solutions are used in this application.

According to a first aspect, a communication method is provided. The communication method includes: A first node generates a physical layer protocol data unit (PPDU). The PPDU includes redundancy version (RV) indication information and one or more retransmitted media access control protocol data units (MPDUs), and the RV indication information is used to indicate RVs of the one or more retransmitted MPDUs. Then, the first node sends the PPDU.

According to the communication method provided in this application, when the PPDU sent by the first node includes one or more retransmitted MPDUs, the first node may include, in the PPDU, the RV indication information used to indicate an RV of each retransmitted MPDU, so that a second node receives each retransmitted MPDU based on the RV indication information. This can resolve a problem that retransmitted MPDUs with different RVs cannot be transmitted in a same transmission process, for example, in a same PPDU. This can reduce a quantity of data transmissions, simplify a data transmission scheduling process, and improve data transmission efficiency.

According to a second aspect, a communication method is provided. The communication method includes: A second node receives a physical layer protocol data unit (PPDU). The PPDU includes redundancy version (RV) indication information and one or more retransmitted media access control protocol data units (MPDUs), and the RV indication information is used to indicate RVs of the one or more retransmitted MPDUs. Then, the second node parses the one or more retransmitted MPDUs based on the RV indication information.

For technical effects of the communication method according to the second aspect, refer to technical effects of the communication method according to the first aspect. Details are not described herein again.

According to a third aspect, a communication apparatus is provided. The communication apparatus includes a processor and a transceiver. The processor is configured to generate a physical layer protocol data unit (PPDU). The PPDU includes redundancy version (RV) indication information and one or more retransmitted media access control protocol data units (MPDUs), and the RV indication information is used to indicate RVs of the one or more retransmitted MPDUs. The transceiver is configured to send the PPDU. The transceiver may be further configured to receive a signal sent by another communication apparatus, for example, a second node, to implement bidirectional communication.

Optionally, the communication apparatus according to the third aspect may further include a memory. The memory stores a program or instructions. When the processor executes the program or the instructions, the communication apparatus according to the third aspect is enabled to perform a function of the first node according to the first aspect.

It should be noted that the communication apparatus according to the third aspect may be a terminal device or a network device, or may be a chip or a chip system disposed in the terminal device or the network device. This is not limited in this application.

For technical effects of the communication apparatus according to the third aspect, refer to technical effects of the communication apparatus according to the first aspect. Details are not described herein again.

According to a fourth aspect, a communication apparatus is provided. The communication apparatus includes a processor and a transceiver. The transceiver is configured to receive a physical layer protocol data unit (PPDU). The PPDU includes redundancy version (RV) indication information and one or more retransmitted media access control protocol data units (MPDUs), and the RV indication information is used to indicate RVs of the one or more retransmitted MPDUs. The processor is configured to parse the one or more retransmitted MPDUs based on the RV indication information. The transceiver may be further configured to send a signal to another communication apparatus, for example, the first node in the first aspect, to implement bidirectional communication.

Optionally, the communication apparatus according to the fourth aspect may further include a memory. The memory stores a program or instructions. When the processor executes the program or the instructions, the communication apparatus according to the sixth aspect is enabled to perform a function of the second node according to the second aspect.

It should be noted that the communication apparatus according to the fourth aspect may be the foregoing terminal device or network device, or may be a chip or a chip system disposed in the terminal device or the network device. This is not limited in this application.

For technical effects of the communication apparatus according to the fourth aspect, refer to technical effects of the communication apparatus according to the first aspect. Details are not described herein again.

In a possible design method according to the first to fourth aspects, different retransmitted MPDUs corresponding to different RVs are transmitted in a preset RV order, and/or different retransmitted MPDUs corresponding to a same RV are transmitted in a historical transmission order. Optionally, the transmission order may be indicated by using 1-bit (bit) indication information, or may not be indicated, but is preconfigured on the first node and the second node.

In a possible design method, the RV indication information may include a total quantity of retransmitted MPDUs in the PPDU and an RV of each retransmitted MPDU. Each retransmitted MPDU has one RV used to indicate a redundancy version of the retransmitted MPDU.

In another possible design method, the RVs of the one or more retransmitted MPDUs belong to a preset RV set, the preset RV set may include one or more types of preset RVs, and the RV indication information may include a quantity of retransmitted MPDUs corresponding to each type of preset RV in the PPDU. The preset RV set may be a candidate RV set including all or some RVs specified in a protocol, and may be dynamically configured by a network by using signaling, or may be preconfigured on the first node and the second node.

Optionally, the RV indication information may further include a total quantity of retransmitted MPDUs in the PPDU, so that the second node checks whether transmission of the quantity of retransmitted MPDUs corresponding to each type of preset RV in the PPDU is correct, to improve reliability of transmission of the indication information.

In still another possible design method, the RV indication information may include an RV in the PPDU and a quantity of retransmitted MPDUs corresponding to each type of RV. For example, the RV in the PPDU may be indicated by using a bitmap (bitmap) manner. It is easily understood that, the bitmap indicates that a quantity of retransmitted MPDUs corresponding to an RV that does not exist is 0. Therefore, the quantity of retransmitted MPDUs corresponding to the RV does not need to be transmitted, to reduce used signaling and resources.

In still another possible design method, the PPDU may further include one or more newly transmitted MPDUs, and the one or more newly transmitted MPDUs are transmitted after the one or more retransmitted MPDUs. Optionally, RVs of a plurality of retransmitted MPDUs are the same. In this case, for the plurality of retransmitted MPDUs, only one RV needs to be transmitted, to further reduce used signaling and resources for transmitting indication information.

In a possible design method, the PPDU may include a retransmitted MPDU in at least one retransmission process. Correspondingly, the PPDU may include at least one group of RV indication information. One retransmission process corresponds to one group of RV indication information. Optionally, a plurality of retransmission processes may correspond to one group of RV indication information. Optionally, if RVs of all retransmitted MPDUs corresponding to a same retransmission process are the same, the PPDU may include only one piece of RV indication information for the same retransmission process, so that only one RV needs to be transmitted, to further reduce used signaling and resources for transmitting indication information.

In a possible design method, the PPDU may include an MPDU of at least one user. Correspondingly, the PPDU may include at least one group of RV indication information. One user corresponds to one group of RV indication information. Optionally, a plurality of users may correspond to one group of RV indication information. Optionally, if RVs of all retransmitted MPDUs corresponding to a same user are the same, the PPDU may include only one piece of RV indication information for the same user, so that only one RV needs to be transmitted, to further reduce used signaling and resources for transmitting indication information.

According to a fifth aspect, a communication method is provided. The communication method includes: A first node receives acknowledgment information from a second node. The acknowledgment information is used to indicate a media access control protocol data unit MPDU incorrectly transmitted in previous transmission. Then, the first node sends, to the second node, a physical layer protocol data unit (PPDU) including the MPDU. A transmission order of the MPDU is determined by a quantity of transmissions of the MPDU and a historical transmission order of the MPDU.

According to the communication method provided in this application, the first node may learn, based on the acknowledgment information sent by the second node, the MPDU incorrectly transmitted in the previous transmission, and determine the transmission order of the MPDU in current transmission based on the quantity of transmissions of the MPDU and the historical transmission order of the MPDU. Then, the first node retransmits, to the second node, the MPDU incorrectly transmitted previously. Correspondingly, the second node may alternatively determine the transmission order of the MPDU in the current transmission based on the quantity of transmissions of the MPDU and the historical transmission order of the MPDU, and parse the MPDU retransmitted in the current transmission for decoding in a combining manner. Indication information related to the retransmission order does not need to be transmitted, so that used signaling and resources of the indication information can be reduced.

According to a sixth aspect, a communication method is provided. The communication method includes: A second node sends acknowledgment information to a first node. The acknowledgment information is used to indicate a media access control protocol data unit MPDU incorrectly transmitted in previous transmission. Then, the second node receives and parses a physical layer protocol data unit (PPDU) that is sent by the first node and that includes the MPDU. A transmission order of the MPDU is determined by a quantity of transmissions of the MPDU and a historical transmission order of the MPDU.

For technical effects of the communication method according to the sixth aspect, refer to technical effects of the communication method according to the fifth aspect. Details are not described herein again.

According to a seventh aspect, a communication apparatus is provided. The communication apparatus includes a processor and a transceiver. The transceiver is configured to receive acknowledgment information from a second node. The acknowledgment information is used to indicate a media access control protocol data unit MPDU incorrectly transmitted in previous transmission. The processor is configured to control the transceiver to send, to the second node, a physical layer protocol data unit (PPDU) including the MPDU. A transmission order of the MPDU is determined by a quantity of transmissions of the MPDU and a historical transmission order of the MPDU.

Optionally, the processor is configured to learn, based on the acknowledgment information sent by the second node, the MPDU incorrectly transmitted in the previous transmission, and generate, in current transmission, a PPDU used to carry the MPDU incorrectly transmitted previously.

Optionally, the communication apparatus according to the seventh aspect may further include a memory. The memory stores a program or instructions. When the processor executes the program or the instructions, the communication apparatus according to the seventh aspect is enabled to perform a function of the first node according to the fifth aspect.

It should be noted that the communication apparatus according to the seventh aspect may be a terminal device or a network device, or may be a chip or a chip system disposed in the terminal device or the network device. This is not limited in this application.

For technical effects of the communication apparatus according to the seventh aspect, refer to technical effects of the communication method according to the fifth aspect. Details are not described herein again.

According to an eighth aspect, a communication apparatus is provided. The communication apparatus includes a transceiver and a processor. The processor is configured to control the transceiver to send acknowledgment information to a first node. The acknowledgment information is used to indicate a media access control protocol data unit MPDU incorrectly transmitted in previous transmission. The transceiver is further configured to receive a physical layer protocol data unit (PPDU) that is sent by the first node and that includes the MPDU. A transmission order of the MPDU is determined by a quantity of transmissions of the MPDU and a historical transmission order of the MPDU. The processor is configured to parse the MPDU.

Optionally, the communication apparatus according to the eighth aspect may further include a memory. The memory stores a program or instructions. When the processing module executes the program or the instructions, the communication apparatus according to the eighth aspect is enabled to perform a function of the second node according to the sixth aspect.

It should be noted that the communication apparatus according to the eighth aspect may be a terminal device or a network device, or may be a chip or a chip system disposed in the terminal device or the network device. This is not limited in this application.

For technical effects of the communication apparatus according to the eighth aspect, refer to technical effects of the communication method according to the fifth aspect. Details are not described herein again.

In the embodiments of the fifth aspect to the eighth aspect, for example, the MPDU may include a first MPDU and a second MPDU, and the first MPDU is transmitted before the second MPDU in the previous transmission. In a possible design method, that a transmission order of the MPDU is determined by a quantity of transmissions of the MPDU and a historical transmission order of the MPDU may include: If a quantity of transmissions of the first MPDU does not reach a maximum quantity of transmissions, the first MPDU is transmitted before the second MPDU in current transmission. If a quantity of transmissions of the first MPDU reaches a maximum quantity of transmissions, and a quantity of transmissions of the second MPDU does not reach the maximum quantity of transmissions, the first MPDU is transmitted after the second MPDU in current transmission.

Optionally, the PPDU may further include default retransmission indication information. The default retransmission indication information is used to indicate that the transmission order of the MPDU is determined by the quantity of transmissions of the MPDU and the historical transmission order of the MPDU.

In a possible design method, the PPDU may further include a retransmission sequence number of the MPDU or an indication of successful reception of the acknowledgment information. The retransmission sequence number is a sequence number determined according to a sequence number update rule based on a sequence number used by the MPDU in the previous transmission.

In another possible design method, the PPDU further includes redundancy version (RV) indication information of the MPDU, and the RV indication information is used to indicate an RV of the MPDU. The RV indication information is in a one-to-one correspondence with a quantity of retransmissions of the MPDU.

In a possible design method, the PPDU may include an MPDU in at least one retransmission process, and the MPDU may be an MPDU in a first retransmission process. The first retransmission process may be any one of the at least one retransmission process.

Optionally, RVs of all MPDUs corresponding to the first retransmission process are the same. In other words, for all MPDUs corresponding to the first retransmission process, only one RV needs to be transmitted, so that used signaling and resources for transmitting indication information can be reduced.

In a possible design method, the PPDU may include an MPDU of at least one user, and the MPDU may be an MPDU of a first user. The first user may be any one of the at least one user.

Optionally, RVs of all MPDUs corresponding to the first user are the same. In other words, for all MPDUs corresponding to the first user, only one RV needs to be transmitted, so that used signaling and resources for transmitting indication information can be reduced.

According to a ninth aspect, a communication method is provided. The communication method includes: A first node receives a first trigger frame sent by a second node. A first RV carried in the first trigger frame is used to indicate the first node to send, in a retransmission process, at least one MPDU incorrectly transmitted previously. Then, the first node sends a first PPDU to the second node. The first PPDU carries the at least one MPDU, and the first PPDU is a TB-PPDU generated by the first node in the retransmission process in response to the first RV carried in the first trigger frame. Then, the first node receives a second trigger frame sent by the second node. A second RV carried in the second trigger frame is used to indicate that all of the at least one MPDU is incorrectly decoded, and indicate the first node to resend the at least one MPDU in a new transmission process. Then, the first node sends a second PPDU to the second node. The second PPDU carries the at least one MPDU, and the second PPDU is a TB-PPDU generated by the first node in the new transmission process based on the second RV carried in the second trigger frame sent by the second node.

According to the communication method provided in this application, when all of the at least one MPDU carried in the first PPDU sent by the first node in the retransmission process is incorrectly transmitted, the first node may resend the at least one MPDU in the new transmission process based on the second RV carried in the second trigger frame sent by the second node. This can avoid a problem that: When all of the at least one MPDU carried in the first PPDU sent by the first node in the retransmission process is incorrectly transmitted, the second node does not parse a signaling field of the first PPDU, and therefore cannot learn whether the first node has sent the MPDU; as a result, two nodes have different understandings about whether the at least one MPDU is successfully transmitted, then the first node no longer sends the at least one MPDU, and data is lost, or the first node still sends the at least one MPDU in the retransmission process, but the second node cannot decode the at least one retransmitted MPDU in a combining manner because the second node does not receive a historical redundancy version of the at least one MPDU. This can improve a decoding success rate and data transmission reliability.

According to a tenth aspect, a communication method is provided. The communication method includes: A second node sends a first trigger frame to a first node. A first RV carried in the first trigger frame is used to indicate the first node to send, in a retransmission process, at least one MPDU incorrectly transmitted previously. Then, the second node receives a first PPDU sent by the first node, and parses, in the retransmission process, the at least one MPDU carried in the first PPDU. The first PPDU carries the at least one MPDU, and the first PPDU is a TB-PPDU generated by the first node in the retransmission process in response to the first RV carried in the first trigger frame. Then, the second node sends a second trigger frame to the first node. A second RV carried in the second trigger frame is used to indicate that all of the at least one MPDU is incorrectly decoded, and indicate the first node to resend the at least one MPDU in a new transmission process. Then, the second node receives a second PPDU sent by the first node, and parses, in the new transmission process, the at least one MPDU carried in the second PPDU. The second PPDU carries the at least one MPDU, and the second PPDU is a TB-PPDU generated by the first node in the new transmission process based on the second RV carried in the second trigger frame sent by the second node.

For technical effects of the communication method according to the tenth aspect, refer to technical effects of the communication method according to the ninth aspect. Details are not described herein again.

According to an eleventh aspect, a communication apparatus is provided. The communication apparatus includes a sending module and a receiving module. The sending module is configured to send a first PPDU to a second node. The first PPDU carries at least one MPDU, and the first PPDU is a TB-PPDU generated by a first node in a retransmission process based on a first RV carried in a first trigger frame sent by the second node. The receiving module is configured to receive a second trigger frame sent by the second node. A second RV carried in the second trigger frame is used to indicate that all of the at least one MPDU is incorrectly decoded, and indicate the first node to resend the at least one MPDU in a new transmission process. The sending module is further configured to send a second PPDU to the second node. The second PPDU carries the at least one MPDU, and the second PPDU is a TB-PPDU generated by the first node in the new transmission process based on the second RV carried in the second trigger frame sent by the second node.

Optionally, the communication apparatus according to the eleventh aspect may further include a processing module, so that the communication apparatus generates, based on RV indication information sent by the second node, a PPDU used to carry a specified redundancy version of an MPDU incorrectly transmitted in previous transmission.

Optionally, the communication apparatus according to the eleventh aspect may further include a storage module. The storage module stores a program or instructions. When the processing module executes the program or the instructions, the communication apparatus according to the eleventh aspect is enabled to perform a function of the first node according to the ninth aspect.

It should be noted that the communication apparatus according to the eleventh aspect may be a terminal device or a network device, or may be a chip or a chip system disposed in the terminal device or the network device. This is not limited in this application.

For technical effects of the communication apparatus according to the eleventh aspect, refer to technical effects of the communication method according to the ninth aspect. Details are not described herein again.

According to a twelfth aspect, a communication apparatus is provided. The communication apparatus includes a processing module, a sending module, and a receiving module. The receiving module is configured to receive a first PPDU sent by a first node. The processing module is configured to parse, in a retransmission process, at least one MPDU carried in the first PPDU. The first PPDU is a TB-PPDU generated by the first node in the retransmission process based on a first RV carried in a first trigger frame sent by a second node. The sending module is configured to send a second trigger frame to the first node. A second RV carried in the second trigger frame is used to indicate that all of the at least one MPDU is incorrectly decoded, and indicate the first node to resend the at least one MPDU in a new transmission process. The receiving module is further configured to receive a second PPDU sent by the first node. The processing module is further configured to parse, in the new transmission process, at least one MPDU carried in the second PPDU. The second PPDU carries the at least one MPDU, and the second PPDU is a TB-PPDU generated by the first node in the new transmission process based on the second RV carried in the second trigger frame sent by the second node.

Optionally, the communication apparatus according to the twelfth aspect may further include a storage module. The storage module stores a program or instructions. When the processing module executes the program or the instructions, the communication apparatus according to the twelfth aspect is enabled to perform a function of the second node according to the tenth aspect.

It should be noted that the communication apparatus according to the twelfth aspect may be a terminal device or a network device, or may be a chip or a chip system disposed in the terminal device or the network device. This is not limited in this application.

For technical effects of the communication apparatus according to the twelfth aspect, refer to technical effects of the communication method according to the ninth aspect. Details are not described herein again.

According to a thirteenth aspect, a communication apparatus is provided. The communication apparatus includes a processor. The processor is coupled to a memory. The memory is configured to store a computer program. The processor is configured to execute the computer program stored in the memory, so that the communication apparatus performs the communication method according to any one of the first aspect to the fourth aspect, the ninth aspect and the tenth aspect, or the possible implementations of the first aspect to the fourth aspect, the ninth aspect and the tenth aspect.

In a possible design, the communication apparatus according to the thirteenth aspect may further include a transceiver. The transceiver may be a transceiver circuit or an input/output interface. The transceiver may be used by the communication apparatus to communicate with another communication apparatus.

In this application, the communication apparatus according to the thirteenth aspect may be the first node and/or the second node, or a chip or a chip system disposed in the first node and/or the second node.

For technical effects of the communication apparatus according to the thirteenth aspect, refer to technical effects of the communication method according to any one of the first aspect to the fourth aspect, the ninth aspect and the tenth aspect, or the possible implementations of the first aspect to the fourth aspect, the ninth aspect and the tenth aspect. Details are not described herein again.

According to a fourteenth aspect, a communication system is provided. The system includes one or more first nodes and one or more second nodes.

According to a fifteenth aspect, a computer-readable storage medium is provided, including computer instructions. When the computer instructions are run on a computer, the computer is enabled to perform the communication method according to any one of the possible implementations of the first aspect to the fourth aspect, the ninth aspect and the tenth aspect.

According to a sixteenth aspect, a computer program product is provided, including a computer program or instructions. When the computer program or instructions are run on a computer, the computer is enabled to perform the communication method according to any one of the possible implementations of the first aspect to the fourth aspect, the ninth aspect and the tenth aspect.

DESCRIPTION OF EMBODIMENTS

The following describes technical solutions of this application with reference to the accompanying drawings.

The technical solutions in embodiments of this application may be used in various communication systems, for example, a Wi-Fi system, a V2X communication system, a device-to-device (device-to-device, D2D) communication system, an internet of vehicles communication system, a long term evolution (long term evolution, LTE) system, an LTE frequency division duplex (frequency division duplex, FDD) system, an LTE time division duplex (time division duplex, TDD), a worldwide interoperability for microwave access (worldwide interoperability for microwave access, WiMAX) communication system, a $5^{th}$ generation ($5^{th}$ generation, 5G) mobile communication system such as an NR system, and a future communication system such as a 6G system.

All aspects, embodiments, or features are presented in this application by describing a system that may include a plurality of devices, components, modules, and the like. It should be appreciated and understood that each system may include another device, component, module, and the like, and/or may not include all devices, components, modules, and the like discussed with reference to the accompanying drawings. In addition, a combination of these solutions may be used.

In addition, in the embodiments of this application, the terms such as "for example" and "such as" are used to represent giving an example, an illustration, or a description. Any embodiment or design scheme described as an "example" in this application should not be explained as being more preferred or having more advantages than another embodiment or design scheme. Exactly, the term "example" is used to present a concept in a specific manner.

In the embodiments of this application, the terms "information (information)", "signal (signal)", "message (message)", "channel (channel)", and "signaling (signaling)" may sometimes be interchangeably used. It should be noted that meanings expressed by the terms are consistent when differences between the terms are not emphasized. "Of (of)", "corresponding (corresponding, relevant)", and "corresponding (corresponding)" may be interchangeably used sometimes. It should be noted that meanings expressed by the terms are consistent when differences between the terms are not emphasized.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to a similar technical problem.

Figure 1:
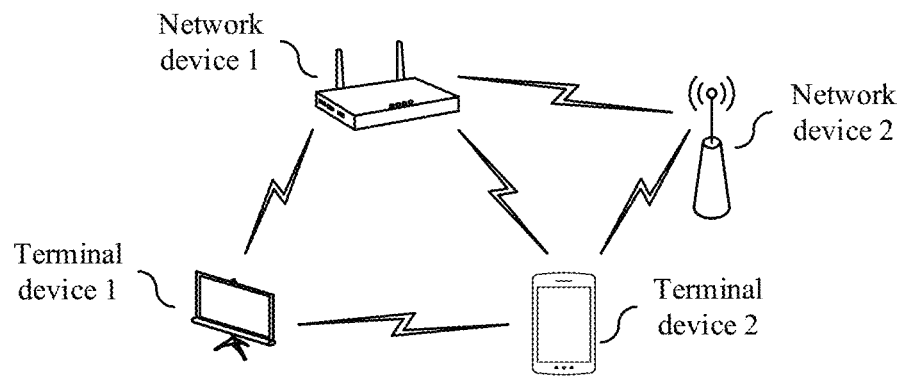
FIG. 1 is a schematic diagram of an architecture of a communication system according to an embodiment of this application.

Some scenarios in the embodiments of this application are described by using a scenario in a Wi-Fi communication system shown in FIG. 1 as an example. It should be noted that the solutions in the embodiments of this application may also be used in another mobile communication system, and a corresponding name may also be replaced with a name of a corresponding function in the another mobile communication system.

For ease of understanding the embodiments of this application, the Wi-Fi communication system shown in FIG. 1 is used as an example to describe in detail a communication system applicable to the embodiments of this application.

As shown in FIG. 1, the Wi-Fi communication system includes one or more terminal devices, such as a terminal device 1 and a terminal device 2, and/or one or more network devices, such as a network device 1 and a network device 2.

In the embodiments of this application, the network device is a device that is located on a network side of the Wi-Fi communication system and that has a wireless transceiver function, or a chip or a chip system that may be disposed in the device. The network device includes but is not limited to an access point (access point, AP) in a wireless fidelity (wireless fidelity, Wi-Fi) system, for example, a home gateway, a router, a server, a switch, or a bridge, an evolved NodeB (evolved NodeB, eNB), a radio network controller (radio network controller, RNC), a nodeB (NodeB, NB), a base station controller (base station controller, BSC), a base transceiver station (base transceiver station, BTS), a home base station (for example, a home evolved NodeB, a home NodeB, or an HNB), a baseband unit (baseband unit, BBU), a wireless relay node, a wireless backhaul node, or a transmission point (transmission and reception point, TRP or transmission point, TP), or may be a gNB in a 5G system, for example, a new radio (new radio, NR) system, or a transmission point (TRP or TP), or one or a group of antenna panels (including a plurality of antenna panels) of a base station in the 5G system, or may be a network node that constitutes a gNB or a transmission point, for example, a baseband unit (BBU), a distributed unit (distributed unit, DU), or a roadside unit (roadside unit, RSU) having a base station function.

The terminal device is a terminal that accesses the Wi-Fi communication system and that has a wireless transceiver function, or a chip or a chip system that may be disposed in the terminal. The terminal device may also be referred to as a user apparatus, an access terminal, a subscriber unit, a subscriber station, a mobile station, a remote station, a remote terminal, a mobile device, a user terminal, a terminal, a wireless communication device, a user agent, or the like. The terminal device in the embodiments of this application may be a mobile phone (mobile phone), a tablet computer (Pad), a computer with a wireless receiving and sending function, a virtual reality (Virtual Reality, VR) terminal device, an augmented reality (Augmented Reality, AR) terminal device, a wireless terminal in industrial control (industrial control), a wireless terminal in unmanned driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), a vehicle-mounted terminal, an RSU that has a terminal function, or the like. The terminal device in this application may alternatively be a vehicle-mounted module, a vehicle-mounted component, a vehicle-mounted chip, or a vehicle-mounted unit that is built in a vehicle as one or more components or units. By using the vehicle-mounted module, the vehicle-mounted component, the vehicle-mounted chip, or the vehicle-mounted unit that is built in the vehicle, the vehicle may implement the communication method provided in this application.

It should be noted that the communication method provided in the embodiments of this application may be used between any two nodes shown in FIG. 1, for example, between terminal devices, between network devices, or between a terminal device and a network device. For communication between the terminal devices, if there is a network device, it is a scenario with network coverage. If there is no network device, it is a scenario without network coverage. In the scenario with network coverage, communication between terminal devices may be performed by using a resource configured by the network device. In the scenario without network coverage, communication between terminal devices may be performed by using a preconfigured resource.

It should be understood that FIG. 1 is merely an example simplified schematic diagram for ease of understanding. The communication system may further include another network device and/or another terminal device that are/is not shown in FIG. 1.

Figure 2:
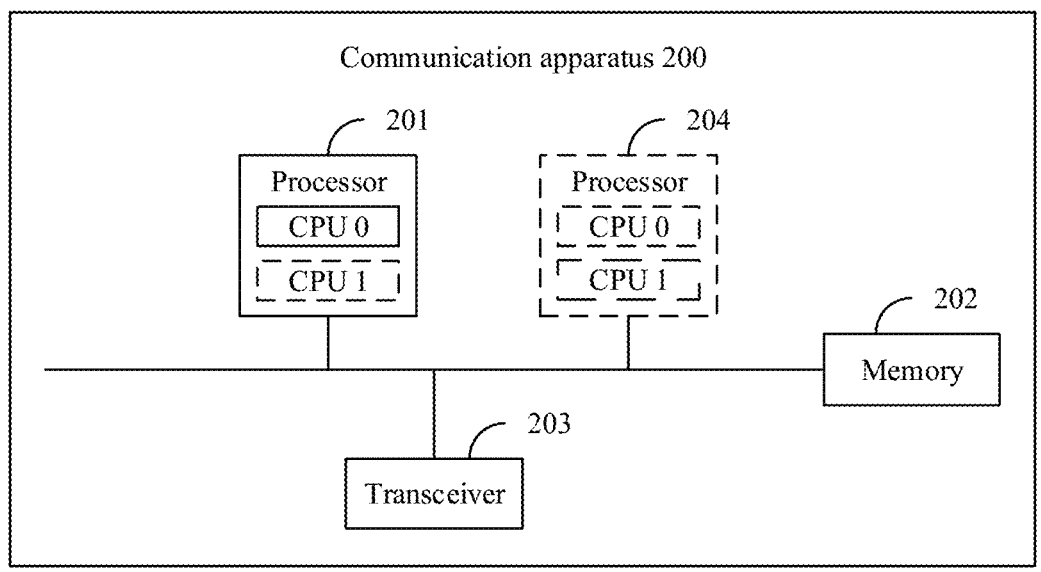
FIG. 2 is a schematic diagram 1 of a structure of a communication apparatus according to an embodiment of this application.

FIG. 2 is a schematic diagram of a structure of a communication apparatus 200 to which a communication method according to an embodiment of this application is applicable. The communication apparatus 200 may be a terminal device, or may be a chip used in a terminal device, or another component having a terminal function. As shown in FIG. 2, the communication apparatus 200 may include at least one processor 201, a memory 202, and a transceiver 203. There is a signal connection between the at least one processor 201, the memory 202, and the transceiver 203. For example, the processor 201, the memory 202, and the transceiver 203 may be connected through a bus.

The following describes each component of the communication apparatus 200 in detail with reference to FIG. 2.

The processor 201 is a control center of the communication apparatus 200, and may be one processor or may be a collective term of a plurality of processing elements. For example, the processor 201 is one or more central processing units (central processing units, CPUs), or may be an application-specific integrated circuit (application specific-integrated circuit, ASIC), or is configured as one or more integrated circuits implementing the embodiments of this application, for example, one or more digital signal processors (digital signal processors, DSPs), or one or more field programmable gate arrays (field programmable gate arrays, FPGAs).

The processor 201 may execute various functions of the communication apparatus 200 by running or executing a software program stored in the memory 202 and invoking data stored in the memory 202.

During specific implementation, in an embodiment, the processor 201 may include one or more CPUs, for example, a CPU 0 and a CPU 1 shown in FIG. 2.

During specific implementation, in an embodiment, the communication apparatus 200 may alternatively include a plurality of processors, for example, the processor 201 and a processor 204 shown in FIG. 2. Each of the processors may be a single-core processor (single-CPU) or may be a multi-core processor (multi-CPU). The processor herein may be one or more communication devices, circuits, and/or processing cores configured to process data (for example, computer program instructions).

The memory 202 may be a read-only memory (read-only memory, ROM) or another type of static storage communication device that can store static information and instructions, or a random access memory (random access memory, RAM) or another type of dynamic storage communication device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, or the like), a magnetic disk storage medium or another magnetic storage communication device, or any other medium that can be used to carry or store expected program code in a form of an instruction or a data structure and that can be accessed by a computer, but is not limited thereto. The memory 202 may exist independently, or may be integrated with the processor 201.

The memory 202 is configured to store a software program for performing solutions of this application, and the processor 201 controls execution of the software program. For the foregoing specific implementations, refer to the following method embodiments. Details are not described herein again.

The transceiver 203 is configured to communicate with another communication apparatus. Certainly, the transceiver 203 may be further configured to communicate with a communication network. The transceiver 203 may include a receiving unit for implementing a receiving function and a sending unit for implementing a sending function.

It should be noted that a structure of the communication apparatus 200 shown in FIG. 2 does not constitute a limitation on the communication apparatus. An actual communication apparatus may include more or fewer components than those shown in the figure, or combine some components, or have different component arrangement.

The following first describes technical terms used in the embodiments of this application.

PPDU: The physical layer protocol data unit (PHY protocol data unit, PPDU) is generally referred to as a physical layer data packet or a data packet. The PPDU generally includes a preamble field and a data field, in other words, a preamble field+a data field=one PPDU. Generally, one transmission process includes only one PPDU. The data field may carry data of only one user or data of a plurality of users. When the data field carries the data of the plurality of users, data of each user may be considered as a PSDU. In addition, for any one of the foregoing users, data of one or more retransmission processes may be further included.

PSDU: The physical layer service data unit (PHY service data unit, PSDU) is used to carry MPDUs or A-MPDUs of one or more users. In other words, a preamble field+PSDUs of one or more users=one PPDU.

MPDU: The media access control protocol data unit (MAC protocol data unit, MPDU) is a MAC frame carried in a PSDU, and is used to carry user data.

A-MPDU: The aggregated media access control protocol data unit (aggregated MAC protocol data unit, A-MPDU) is a plurality of MPDUs that are aggregated and sent by using one physical-layer preamble. This can effectively reduce overheads caused by physical-layer preambles and contention for channels, to improve data transmission efficiency.

Transmission type (transmission type): The transmission type includes new transmission, the $1^{st}$ retransmission, the $2^{nd}$ retransmission, ..., and the $L^{th}$ retransmission. L is a maximum number of retransmissions specified by the system, and L+1 is a maximum quantity of transmissions.

It should be noted that, in a HARQ scenario, newly transmitted data in a broad sense means data that has complete information bits and check bits, and that does not need to be combined with previously prestored received data by a receive end to complete decoding, and is not necessarily data that has never been transmitted before.

RV: The redundancy version (redundancy version, RV) is also referred to as an RV version number. The meaning of the RV is a pattern (pattern) of information bits and check bits that are included in a code block, for example, an MPDU. It is easily understood that, data transmitted in transmission processes of different transmission types may use a same RV, or may use different RVs. This is not limited in the embodiments of this application. For example, the RV may be used to indicate a transmission type. In this case, the RV needs to be in a one-to-one correspondence with the transmission type. For another example, when the RV is not used to indicate a transmission type, two transmissions of different transmission types may alternatively use a same RV, in other words, one RV may correspond to a plurality of transmission types. For a specific implementation, refer to the following method embodiments. Details are not described herein again.

It should be noted that some MPDUs are located in a code word (code word, CW) or a code block (code block, CB). Therefore, during retransmission, bits carried in some MPDUs are some or all bits encoded based on the code word or the code block in which the MPDUs are located. In addition to the MPDUs included in the code word or the code block, the codeword or the code block may further include header bits (header bits) and tail bits (tail bits).

The following describes in detail communication methods provided in the embodiments of this application with reference to FIG. 3 to FIG. 24.

Figure 3:
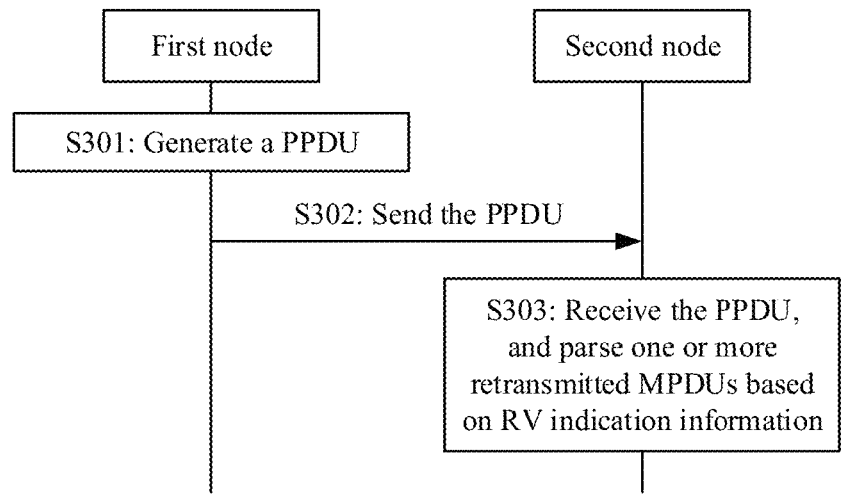
FIG. 3 is a schematic flowchart 1 of a communication method according to an embodiment of this application.

FIG. 3 is a schematic flowchart 1 of a communication method according to an embodiment of this application. The communication method may be applicable to communication between any two nodes shown in FIG. 1.

As shown in FIG. 3, the communication method includes the following steps.

S301: A first node generates a physical layer protocol data unit (PPDU).

The PPDU includes redundancy version (RV) indication information and one or more retransmitted media access control protocol data units (MPDUs), and the RV indication information is used to indicate RVs of the one or more retransmitted MPDUs.

For example, the first node may be any terminal device or any network device shown in FIG. 1.

S302: The first node sends the PPDU.

S303: A second node receives the PPDU, and parses the one or more retransmitted MPDUs based on the RV indication information.

For example, the second node may be any terminal device or any network device shown in FIG. 1.

In a possible design method, different retransmitted MPDUs corresponding to different RVs are transmitted in a preset RV order, and/or different retransmitted MPDUs corresponding to a same RV are transmitted in a historical transmission order.

In a possible implementation, different RVs correspond to different retransmission MPDUs. In other words, different retransmission MPDUs have different RVs, and the different retransmission MPDUs are transmitted in a preset RV order.

In another possible implementation, a same RV corresponds to different retransmitted MPDUs. In other words, different retransmitted MPDUs have a same RV, and the different retransmitted MPDUs are transmitted in a historical transmission order.

In still another possible implementation, different RVs correspond to different retransmitted MPDUs, and a same RV corresponds to different retransmitted MPDUs. In other words, some retransmitted MPDUs have different RVs, and some retransmitted MPDUs have a same RV. In this case, different retransmitted MPDUs corresponding to different RVs are transmitted in a preset RV order, and different retransmitted MPDUs corresponding to a same RV are transmitted in a historical transmission order.

For example, Table 1 is a correspondence between an RV value and a transmission type according to an embodiment of this application. As shown in Table 1, there are a total of four RV values: 0, 1, 2, and 3, respectively corresponding to these transmission types: the 1st retransmission, the 2nd retransmission, the 3rd retransmission, and the 4th retransmission. The foregoing preset RV order may be: transmitting MPDUs in descending order of the RV values. It is assumed that in previous transmission, an MPDU 1 is retransmitted for the third time, an MPDU 2 and an MPDU 3 are retransmitted for the second time, the MPDU 2 is located before the MPDU 3, an MPDU 4 and an MPDU 5 are retransmitted for the first time, the MPDU 4 is located before the MPDU 5, and the MPDU 1 to the MPDU 5 are all incorrectly transmitted in the previous transmission. In this case, RVs of the MPDU 1 to the MPDU 5 in current transmission are 3, 2, 2, 1, and 1, and a current transmission order is: the MPDU 1, the MPDU 2, the MPDU 3, the MPDU 4, and the MPDU 5.

It should be noted that, an MPDU correctly transmitted in the previous transmission does not need to be retransmitted in the current transmission, to save resources and improve transmission efficiency. For example, it is assumed that in the previous transmission, the MPDU 4 is correctly transmitted, and the MPDU 1 to the MPDU 3 and the MPDU 5 are incorrectly transmitted. In this case, a current transmission order is: the MPDU 1, the MPDU 2, the MPDU 3, and the MPDU 5.

TABLE 1

| RV | Transmission type |
|---|---|
| 0 | The $1^{st}$ retransmission |
| 1 | The $2^{nd}$ retransmission |
| 2 | The $3^{rd}$ retransmission |
| 3 | The $4^{th}$ retransmission |

In addition, the correspondence between the RV value and the transmission type shown in Table 1 is a one-to-one correspondence, and is applicable to a scenario in which an RV is directly used to indicate a quantity of retransmissions. It is easily understood that, the RV value and the quantity of retransmissions may not be in a one-to-one correspondence. For example, one RV may alternatively correspond to a plurality of retransmissions.

For example, Table 2 is another correspondence between an RV value and a transmission type according to an embodiment of this application. As shown in Table 2, there are a total of eight retransmissions and four RV values: 0, 1, 2, and 3. Each RV corresponds to two retransmissions. For example, RV=0 corresponds to the 1st retransmission and the 2nd retransmission, RV=1 corresponds to the 3rd retransmission and the 4th retransmission, and RV=2 corresponds to the 5th retransmission and the 6th retransmission, and RV=3 corresponds to the 7th retransmission and the 8th retransmission. In other words, two or more adjacent retransmissions may use a same RV.

TABLE 2

| RV | Transmission type |
|---|---|
| 0 | The $1^{st}$ retransmission |
| 0 | The $2^{nd}$ retransmission |
| 1 | The $3^{rd}$ retransmission |
| 1 | The $4^{th}$ retransmission |
| 2 | The $5^{th}$ retransmission |
| 2 | The $6^{th}$ retransmission |
| 3 | The $7^{th}$ retransmission |
| 3 | The $8^{th}$ retransmission |

Optionally, the preset RV order may be indicated by using 1-bit (bit) indication information, or may not be indicated, and data is directly limited to be transmitted in a specific preset RV order. For example, the preset RV order may be preconfigured on the first node and the second node.

In the following examples, unless otherwise specified, description is provided by using an example in which the preset RV order is that MPDUs are transmitted in descending order of RV values, and different retransmitted MPDUs corresponding to a same RV are transmitted in a historical transmission order.

In a possible design method, the RV indication information may include a total quantity of retransmitted MPDUs in the PPDU and an RV of each retransmitted MPDU. Each retransmitted MPDU corresponds to one piece of RV indication information used to indicate the RV of the retransmitted MPDU.

Figure 4:
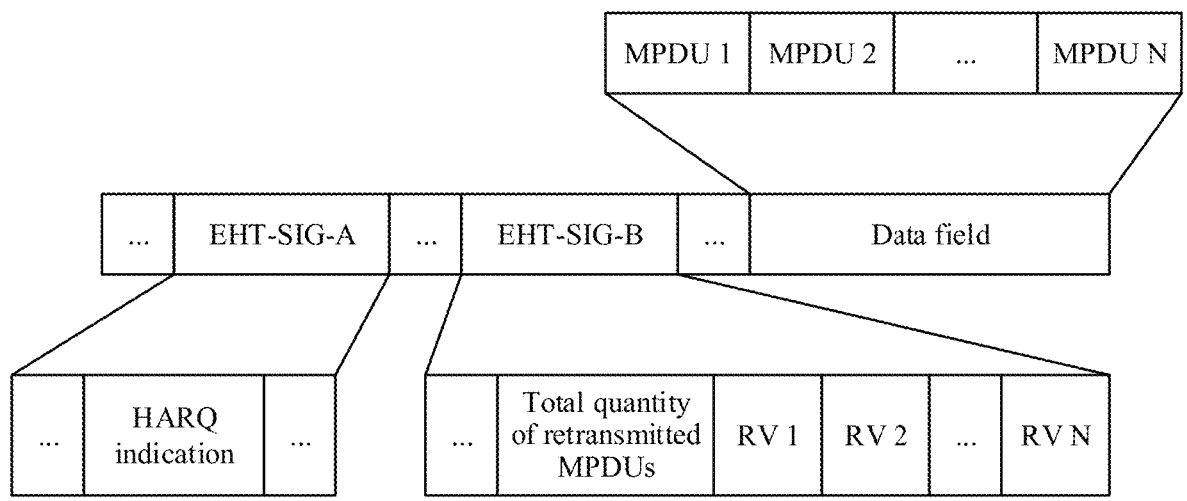
FIG. 4 is a schematic diagram 1 of a structure of a PPDU according to an embodiment of this application.

FIG. 4 is a schematic diagram 1 of a structure of the PPDU according to an embodiment of this application. As shown in FIG. 4, the PPDU includes an MPDU of one user. To be specific, the PPDU includes only one PSDU, and an EHT-SIG-B field in a signaling (signaling) field (field) of the PPDU (a part of a preamble field, and the preamble field is also known as a control field, or the like) carries a total quantity of N retransmitted MPDUs (an MPDU 1, an MPDU 2, ..., and an MPDU N) carried in a data (payload) field (also known as data payload field, payload field) of the PPDU, and N RVs (an RV 1, an RV 2, ..., and an RV N). The N retransmitted MPDUs are in a one-to-one correspondence with the N RVs. It is easily understood that, the second node may decode, based on the RVs of the retransmitted MPDUs, retransmitted MPDUs corresponding to the RVs in a combining (combining) manner.

It should be noted that different retransmitted MPDUs in the N retransmitted MPDUs may correspond to different RVs. For example, refer to Table 1. An RV of the MPDU 1 may be 3, and an RV of the MPDU N may be 0.

In still another possible design method, the RVs of the one or more retransmitted MPDUs belong to a preset RV set, the preset RV set may include one or more types of preset RVs, and the RV indication information may include a quantity of retransmitted MPDUs corresponding to each type of preset RV in the PPDU. The preset RV set may be a candidate RV set including all or some RVs specified in a protocol, and may be dynamically configured by a network by using signaling, or may be preconfigured on the first node and the second node.

Figure 5:
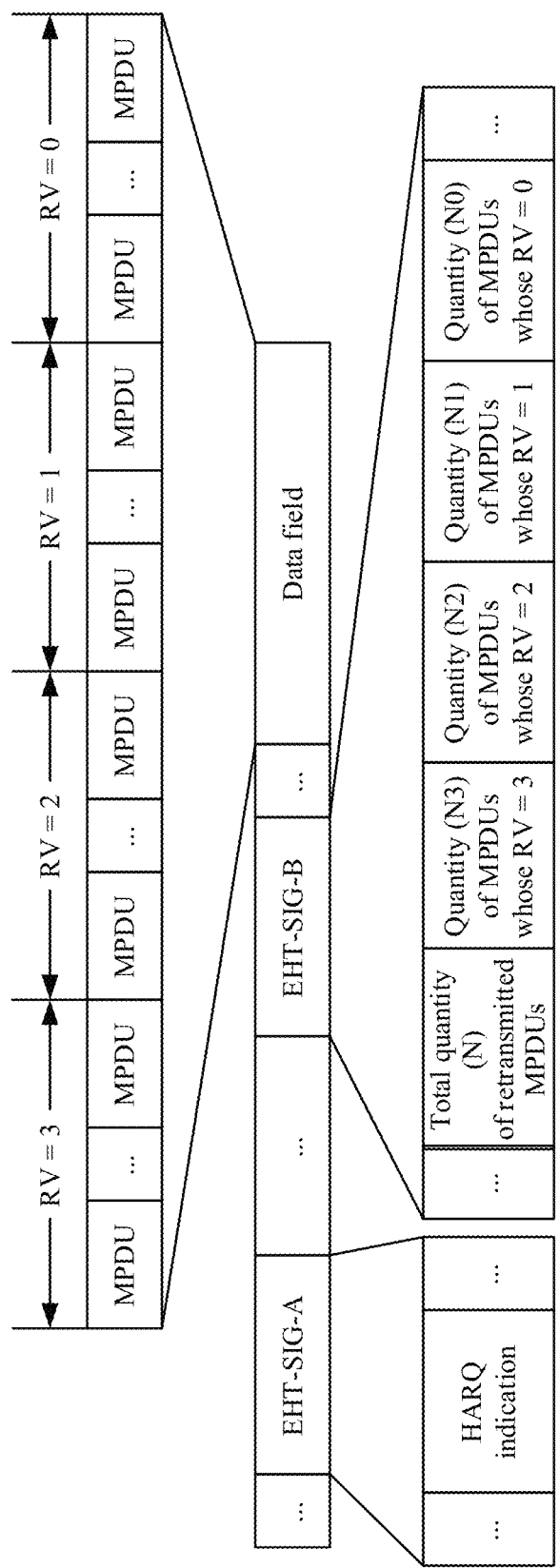
FIG. 5 is a schematic diagram 2 of a structure of a PPDU according to an embodiment of this application.

FIG. 5 is a schematic diagram 2 of a structure of the PPDU according to an embodiment of this application. With reference to Table 1, the preset RV set may be all of the four RV values {0, 1, 2, 3} shown in Table 1, or may be some of the values. For example, a maximum quantity of transmissions may be set to 3, and an RV value such as RV=11 is not included. As shown in FIG. 5, the PPDU includes an MPDU of one user. To be specific, the PPDU includes only one PSDU, and an EHT-SIG-B field in a signaling field of the PPDU carries a quantity of retransmitted MPDUs corresponding to each type of RV. RV=3, RV=2, RV=1, and RV=0 respectively correspond to quantities N3, N2, N1, and N0 of retransmitted MPDUs. It is easily understood that, the second node may decode a corresponding retransmitted MPDU in a combining manner based on the quantity of retransmitted MPDUs corresponding to the RV values.

It should be noted that the N retransmitted MPDUs may alternatively not include retransmitted MPDUs corresponding to some RV values. In this case, a quantity of retransmitted MPDUs corresponding to the some RV values is 0, and a quantity of retransmitted MPDUs corresponding to the some RV values carried in the EHT-SIG-B field is also 0. For example, refer to FIG. 5. When RV=2, a corresponding quantity of retransmitted MPDUs is 0, that is, N2=0.

Optionally, when the PPDU includes only a retransmitted MPDU, the RV indication information may further include a total quantity $N_{retx}$ of retransmitted MPDUs in the PPDU. $N_{retx}$=N3+N2+N1+N0. The second node checks whether transmission of the quantity of retransmitted MPDUs corresponding to each type of preset RV in the PPDU is correct, to improve reliability of transmission of the indication information. It is easily understood that, four of $N_{retx}$, N3, N2, N1, and N0 may be transmitted, in other words, any one of the foregoing five values may not be transmitted according to a convention. For example, when $N_{retx}$ is included and N0 is not included, the second node may calculate N0 based on $N_{retx}$, N3, N2, and N1, or when $N_{retx}$ is not included and N0 is included, the second node may calculate $N_{retx}$ based on N3, N2, N1, and N0.

Optionally, when the PPDU further includes a newly transmitted MPDU, the RV indication information may further include a total quantity $N_{total}$ of all MPDUs in the PPDU. $N_{total}$=$N_{retx}$+$N_{new}$, where $N_{new}$ is a quantity of newly transmitted MPDUs, and $N_{retx}$=N3+N2+N1+N0. It is easily understood that, five of $N_{total}$, N3, N2, N1, N0, and $N_{new}$ may be transmitted. In other words, any one of the foregoing six values may not be transmitted according to a convention. For example, when $N_{total}$ is included and $N_{new}$ is not included, the second node may calculate $N_{new}$ based on $N_{total}$, N3, N2, N1, and N0, or when $N_{total}$ is not included and $N_{new}$ is included, the second node may calculate $N_{total}$ based on N3, N2, N1, N0, and $N_{new}$.

In another possible design method, the RV indication information may include an RV in the PPDU and a quantity of retransmitted MPDUs corresponding to each type of RV. For example, a bitmap (bitmap) manner may be used to indicate whether MPDUs corresponding to one or more types of RVs exist in the PPDU. It is easily understood that, that the bitmap indicates that a type of RV does not exist means that a retransmitted MPDU carried in a corresponding data field does not use the type of RV. In other words, a quantity of retransmitted MPDUs corresponding to the type of RV in the corresponding data field is 0. Therefore, the quantity of retransmitted MPDUs corresponding to the RV does not need to be transmitted, to reduce used signaling and resources.

Figure 6:
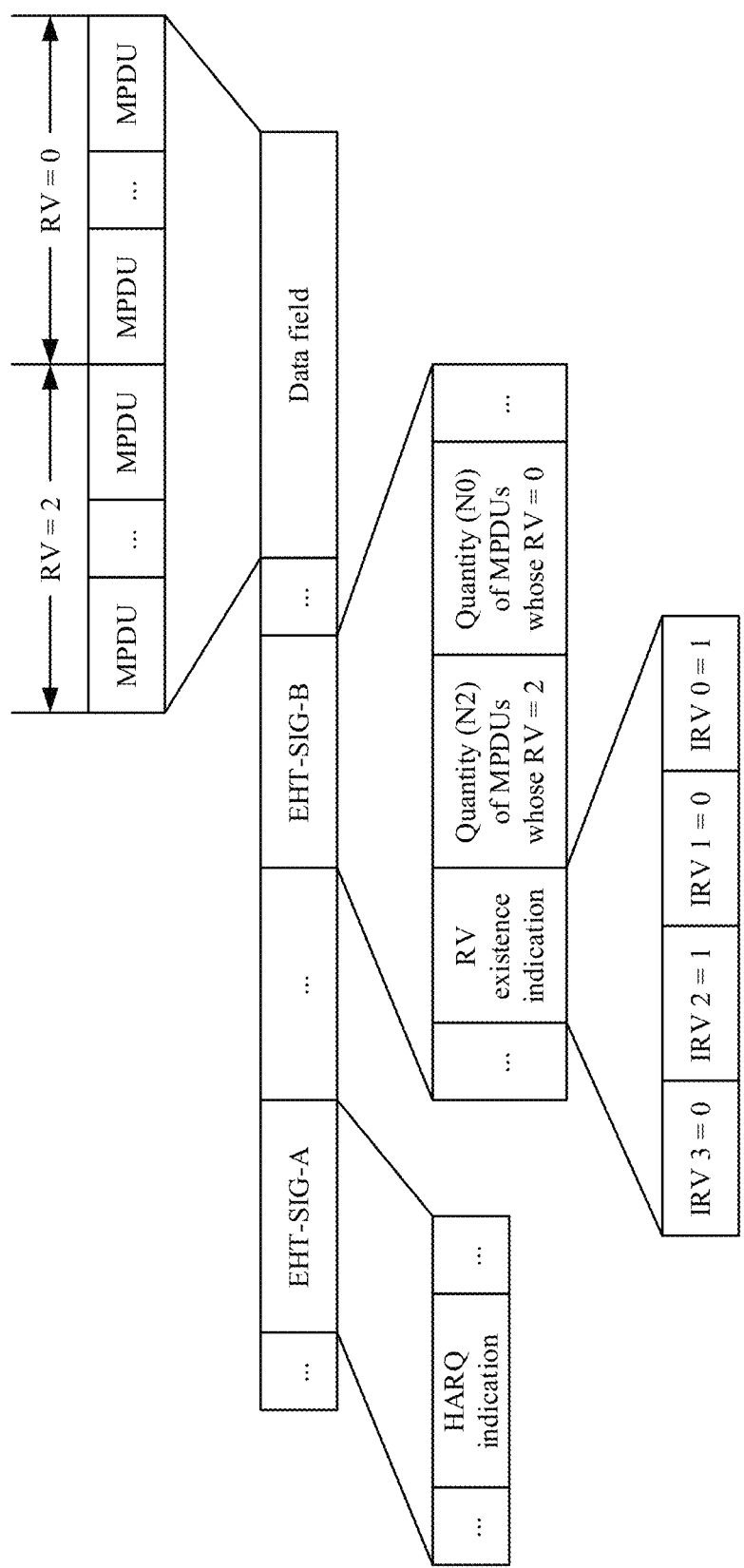
FIG. 6 is a schematic diagram 3 of a structure of a PPDU according to an embodiment of this application.

FIG. 6 is a schematic diagram 3 of a structure of the PPDU according to an embodiment of this application. As shown in FIG. 6, the PPDU includes an MPDU of one user. To be specific, the PPDU includes only one PSDU, and an EHT-SIG-B field in a signaling field of the PPDU carries RV existence indication information (indicator of RV, IRV) corresponding to each type of preset RV. The IRV includes: IRV 3=0, IRV 2=1, IRV 1=0, IRV 0=1, and a quantity of retransmitted MPDUs corresponding to each type of preset RV, for example, a quantity of retransmitted MPDUs whose RV values are 2 and 0. A value of the IRV may be a binary value 0 or 1. The binary number "1" indicates that an MPDU whose RV value is the preset RV exists in the PPDU, and the binary number "0" indicates that no MPDU whose RV value is the preset RV exists in the PPDU. It is easily understood that, the second node may determine an RV of each retransmitted MPDU based on the quantity of retransmitted MPDUs corresponding to the existing RV values, and decode a corresponding retransmitted MPDU in a combining manner.

Figure 7:
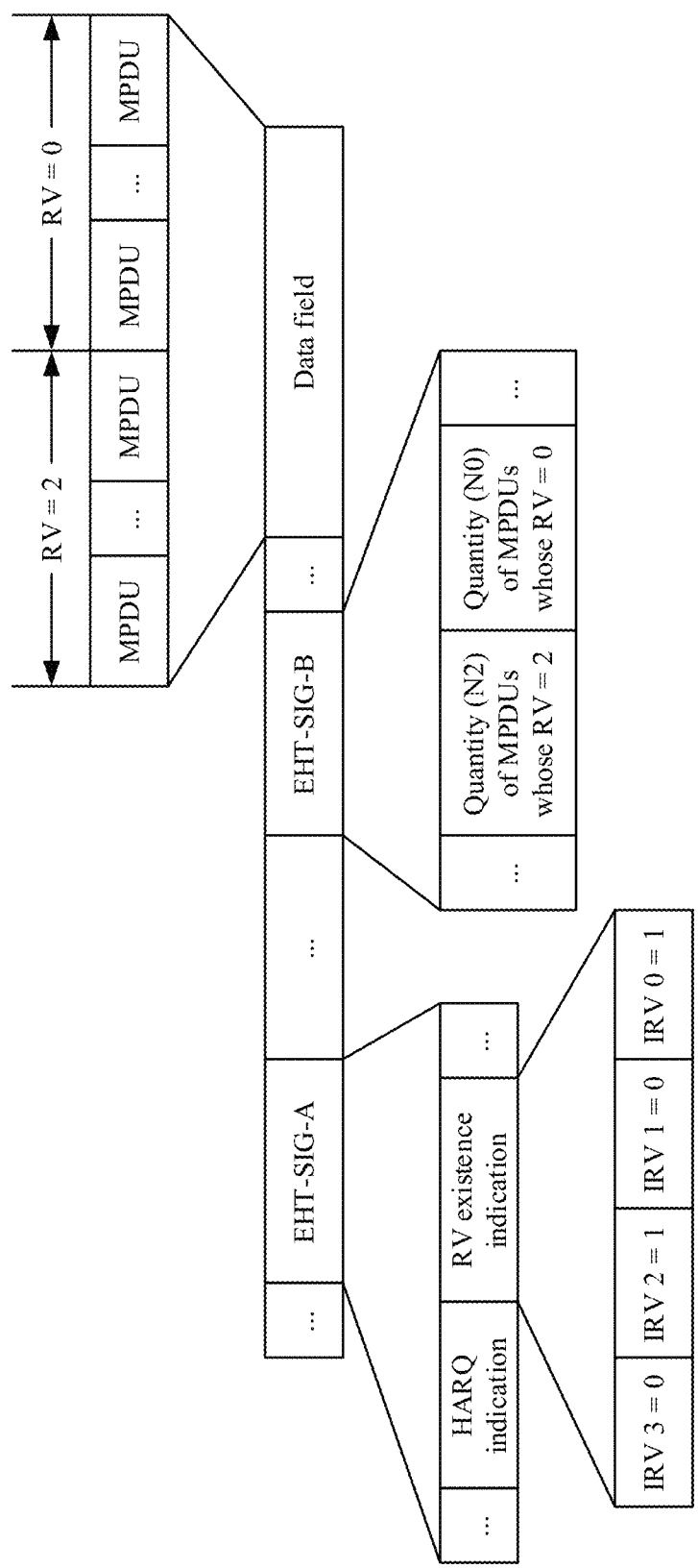
FIG. 7 is a schematic diagram 4 of a structure of a PPDU according to an embodiment of this application.

It should be noted that the quantity of retransmitted MPDUs corresponding to each type of RV and the RV existence indication shown in FIG. 6 are carried in the EHT-SIG-B field. In another embodiment, the quantity of retransmitted MPDUs corresponding to each type of RV and the RV existence indication may alternatively be separately carried. FIG. 7 is a schematic diagram 4 of a structure of a PPDU according to an embodiment of this application. As shown in FIG. 7, an RV existence indication may alternatively be carried in an EHT-SIG-A field in a signaling field, and a quantity of retransmitted MPDUs corresponding to each type of RV is still carried in an EHT-SIG-B field.

Figure 8:
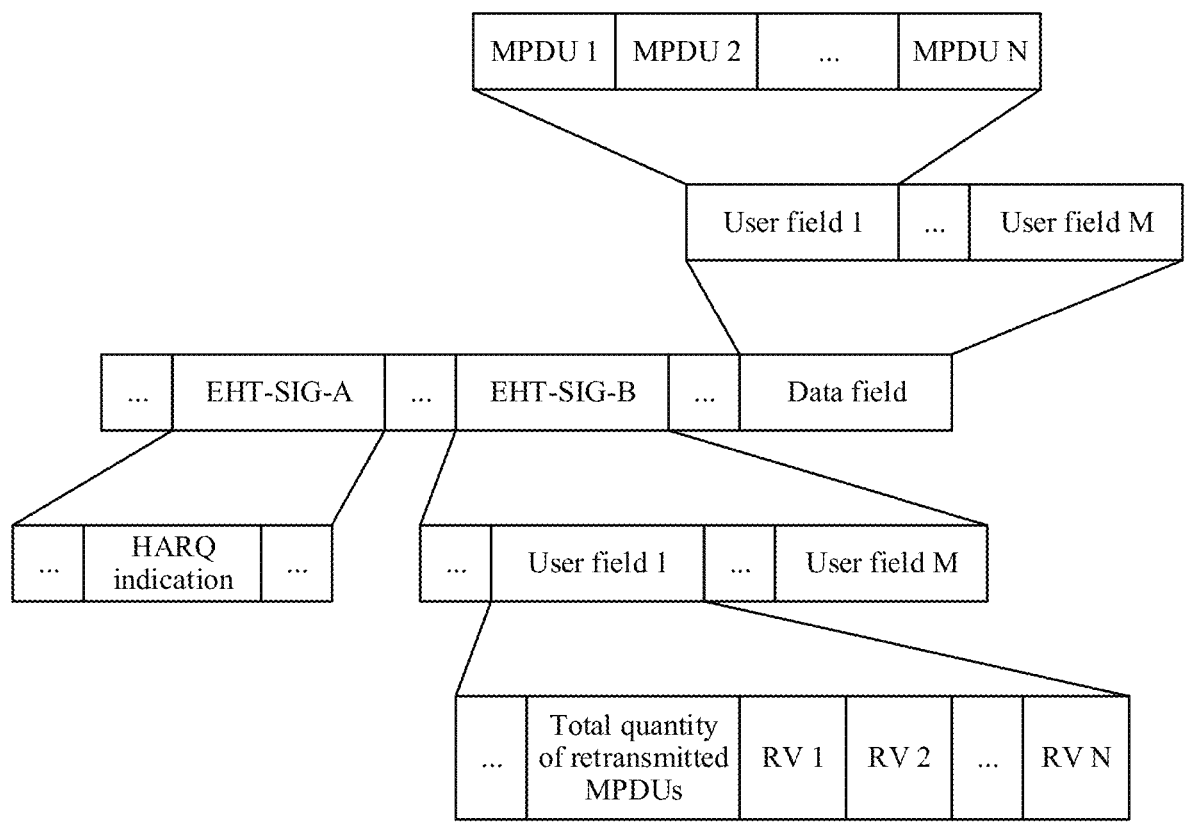
FIG. 8 is a schematic diagram 5 of a structure of a PPDU according to an embodiment of this application.
Figure 9:
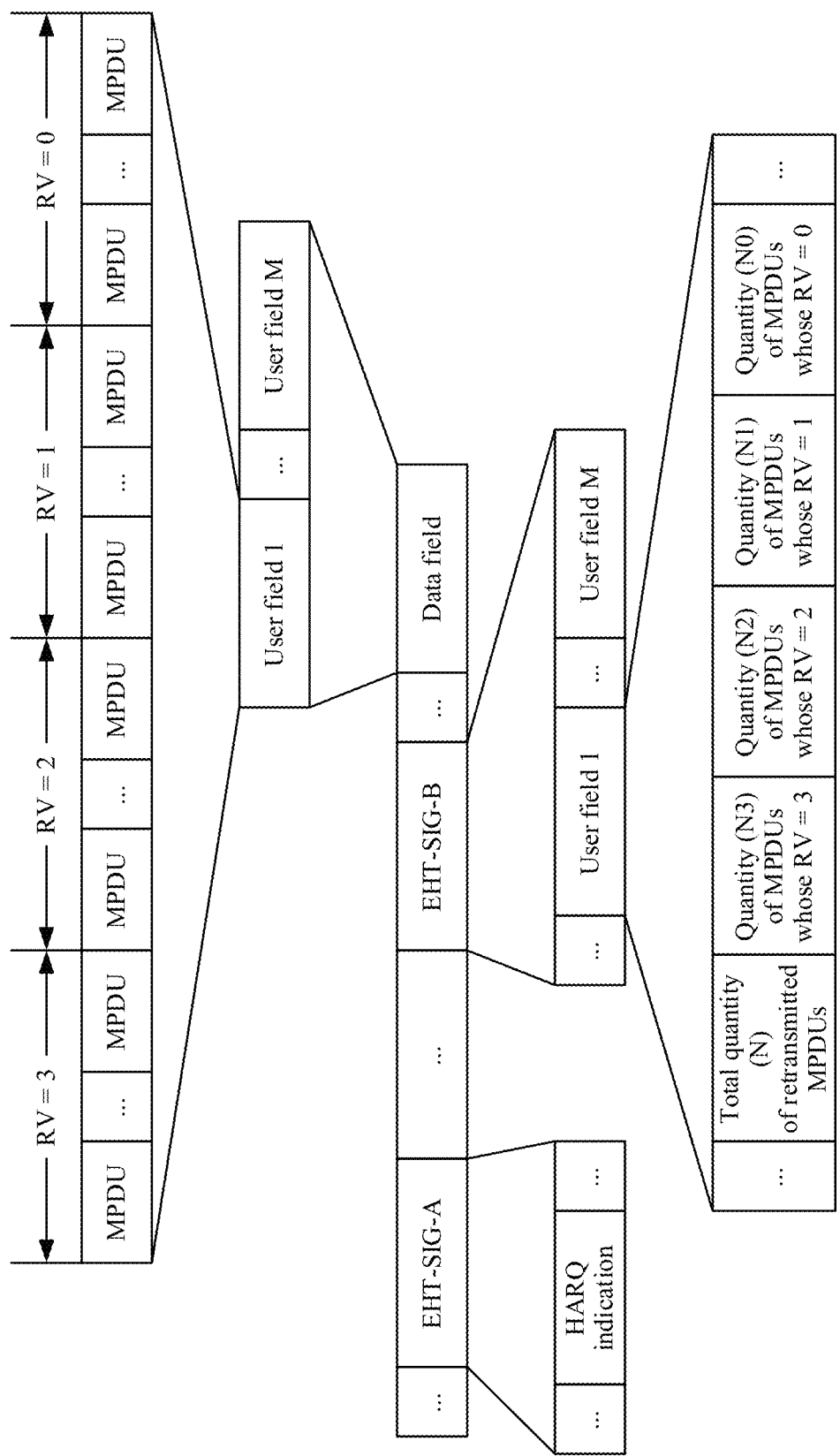
FIG. 9 is a schematic diagram 6 of a structure of a PPDU according to an embodiment of this application.
Figure 10:
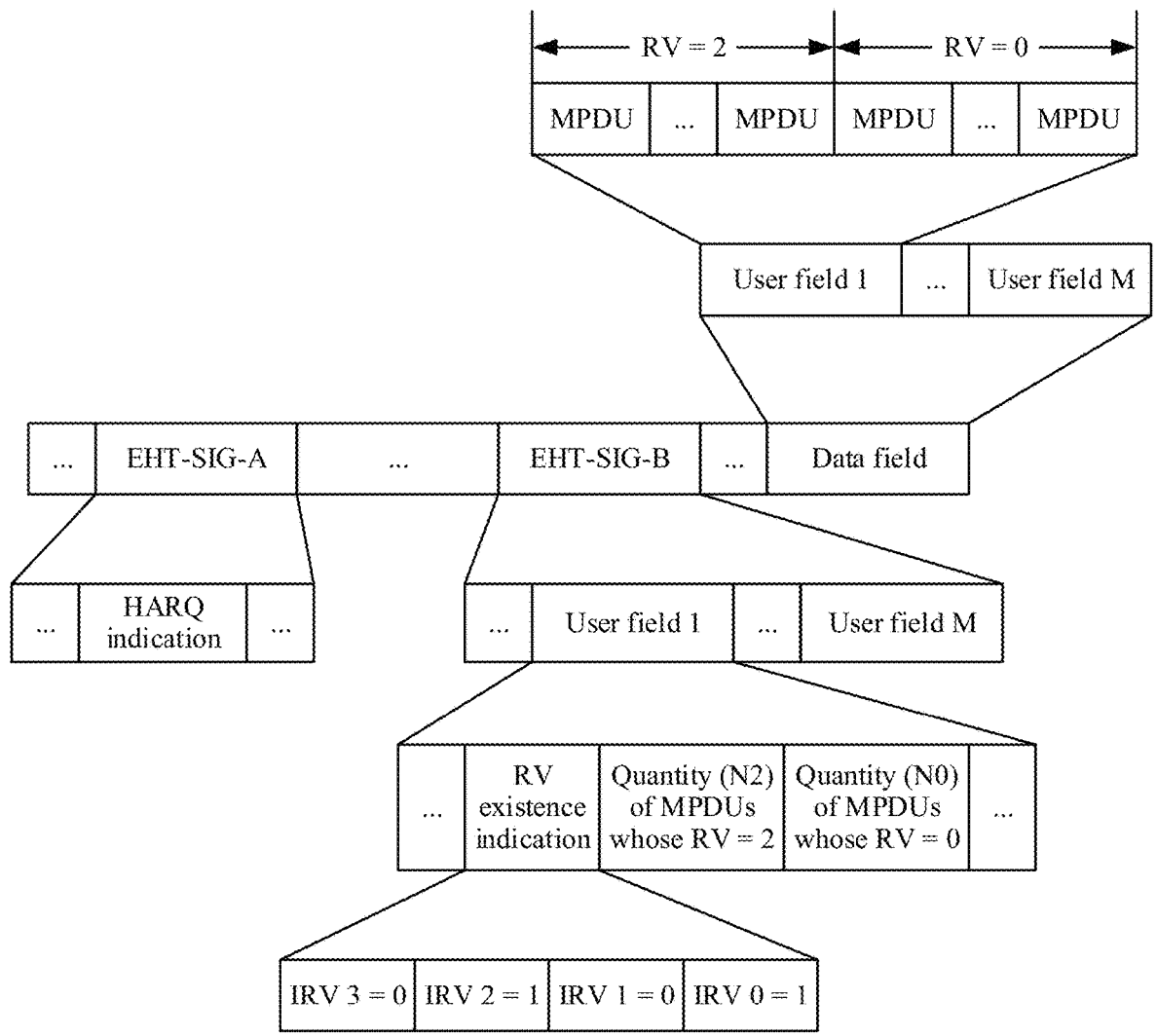
FIG. 10 is a schematic diagram 7 of a structure of a PPDU according to an embodiment of this application.

It should be noted that the examples shown in FIG. 4 to FIG. 7 are all scenarios in which the PPDU carries an MPDU of only one user, in other words, a scenario in which one PPDU includes only one PSDU. In the embodiments of this application, one PPDU may alternatively carry MPDUs of a plurality of users, and operations shown in FIG. 4 to FIG. 6 may be separately performed for each user. For example, for a multi-user scenario, the PPDU shown in FIG. 4 to FIG. 6 may be respectively expanded to schematic diagrams 5 to 7 of structures of a PPDU shown in FIG. 8 to FIG. 10. As shown in FIG. 8 to FIG. 10, an EHT-SIG-B field and a data field of one PPDU may each include a plurality of user fields, for example, M user fields. The M user fields in the data field of the PPDU may be used to carry MPDUs of M users respectively, and the M user fields in the EHT-SIG-B field of the PPDU are used to carry RV indication information of the M users respectively. For a transmission order of retransmitted MPDUs of each user and a manner of carrying the RV indication information, refer to the method shown in FIG. 4 to FIG. 6. Details are not described herein again. Therefore, in a possible design method, the PPDU may include an MPDU of at least one user. Correspondingly, the PPDU may include at least one group of RV indication information. One user corresponds to one group of RV indication information. Optionally, a plurality of users may correspond to one group of RV indication information. Optionally, if RVs of all retransmitted MPDUs corresponding to a same user are the same, the PPDU may include only one piece of RV indication information for the same user, so that only one RV needs to be transmitted, to further reduce used signaling and resources for transmitting indication information.

Figure 11:
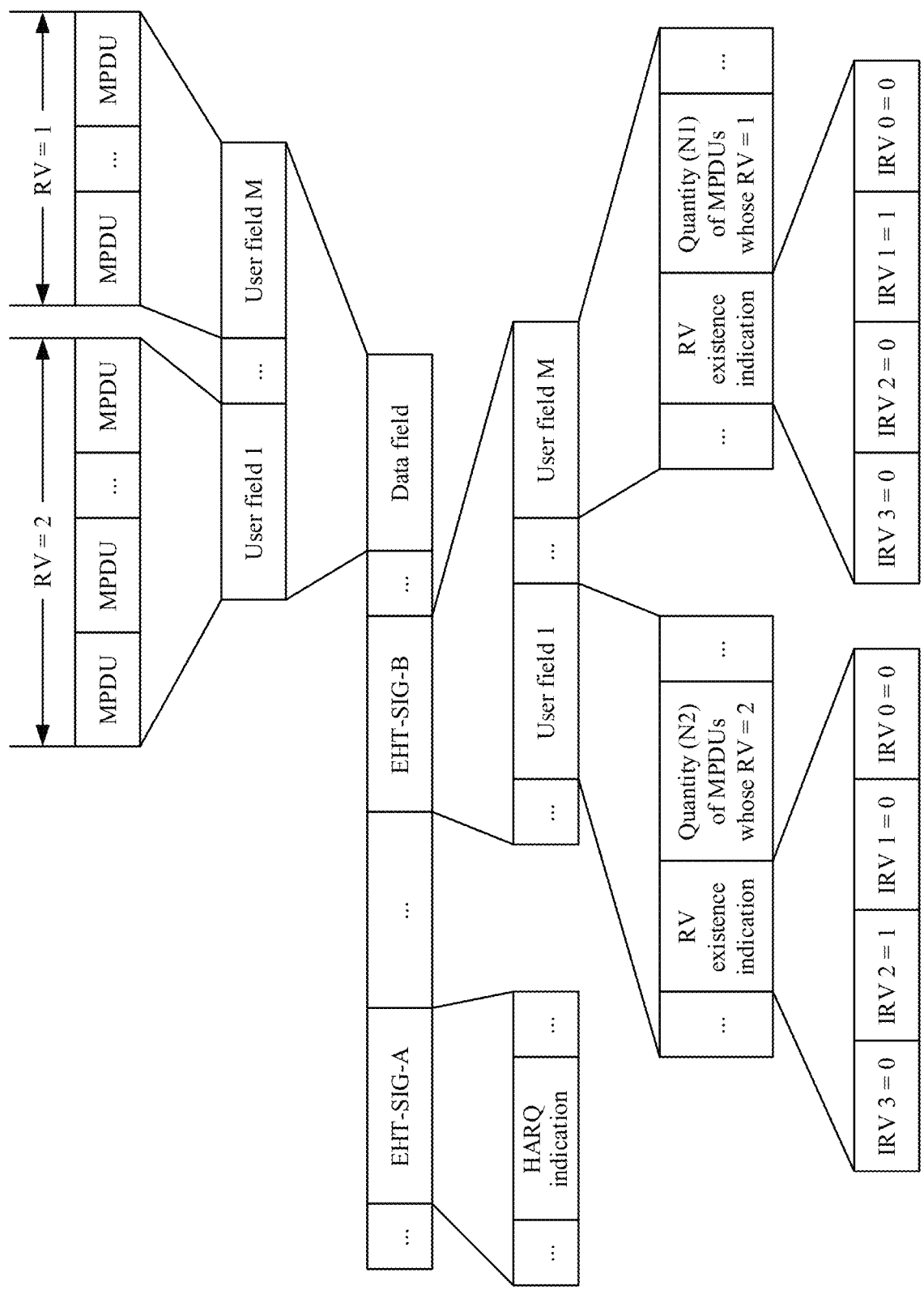
FIG. 11 is a schematic diagram 8 of a structure of a PPDU according to an embodiment of this application.

For example, FIG. 11 is a schematic diagram 8 of a structure of the PPDU according to an embodiment of this application. As shown in FIG. 11, an RV of an MPDU of a user 1 and an RV of an MPDU of a user M are 2 and 1 respectively. Correspondingly, a user field 1 in the EHT-SIG-B field carries only an existence indication of RV=2 of the user 1 and a corresponding quantity N2 of retransmitted MPDUs. However, a user field M in the EHT-SIG-B field carries only an existence indication of RV=1 of the user M and a corresponding quantity N1 of retransmitted MPDUs. It is easily understood that, to further reduce used signaling and resources for transmitting indication information, as shown in FIG. 11, the quantity of retransmitted MPDUs of the user 1 and the quantity of retransmitted MPDUs of the user M may not be transmitted, but only the RV of the user 1 and the RV of the user M are transmitted. In other words, N2 and N1 in FIG. 11 are optional fields. As shown in FIG. 11, an RV existence indication may be in a bitmap form. For example, the RV existence indication of the user 1 is a 4-bit binary number 0100, and the RV existence indication of the user M is a 4-bit binary number 0010. Digits, in descending order, of a 4-bit binary number are existence indications of RV=3, 2, 1, and 0. In addition, a binary number "1" indicates that an MPDU corresponding to the RV value exists in the PPDU, and "0" indicates that the MPDU corresponding to the RV value does not exist in the PPDU.

Figure 12:
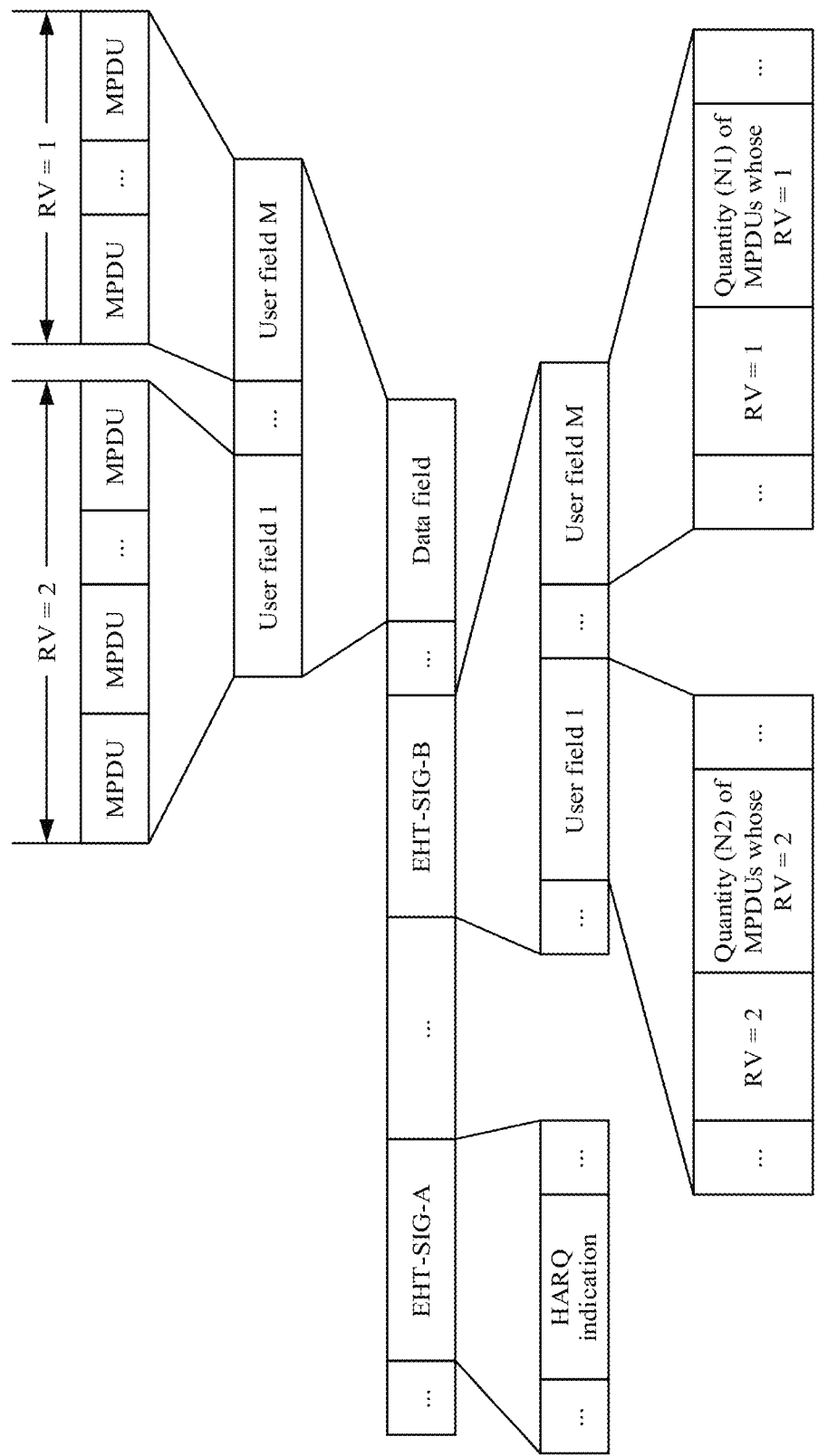
FIG. 12 is a schematic diagram 9 of a structure of a PPDU according to an embodiment of this application.
Figure 13:
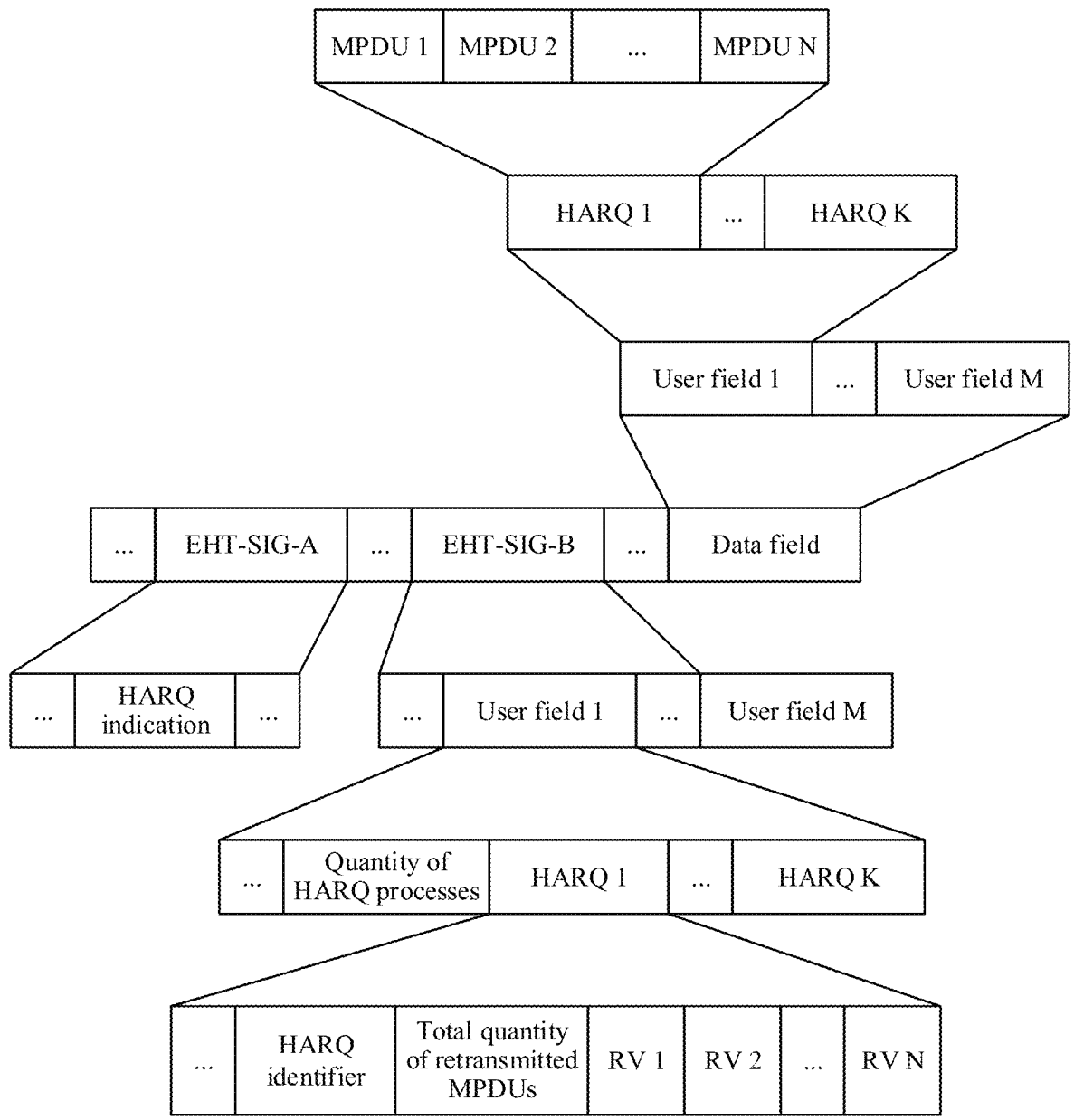
FIG. 13 is a schematic diagram 10 of a structure of a PPDU according to an embodiment of this application.
Figure 14:
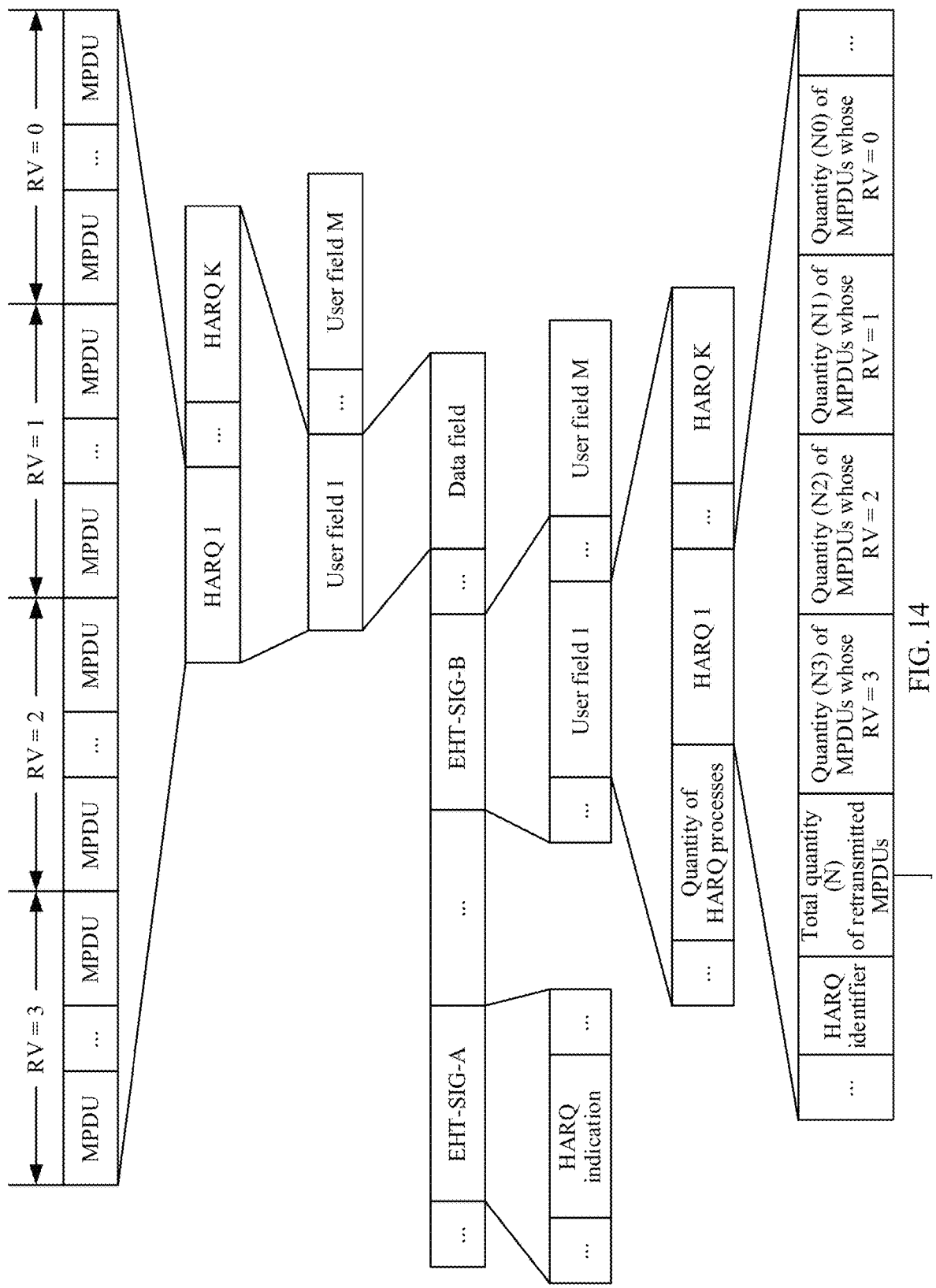
FIG. 14 is a schematic diagram 11 of a structure of a PPDU according to an embodiment of this application.
Figure 15:
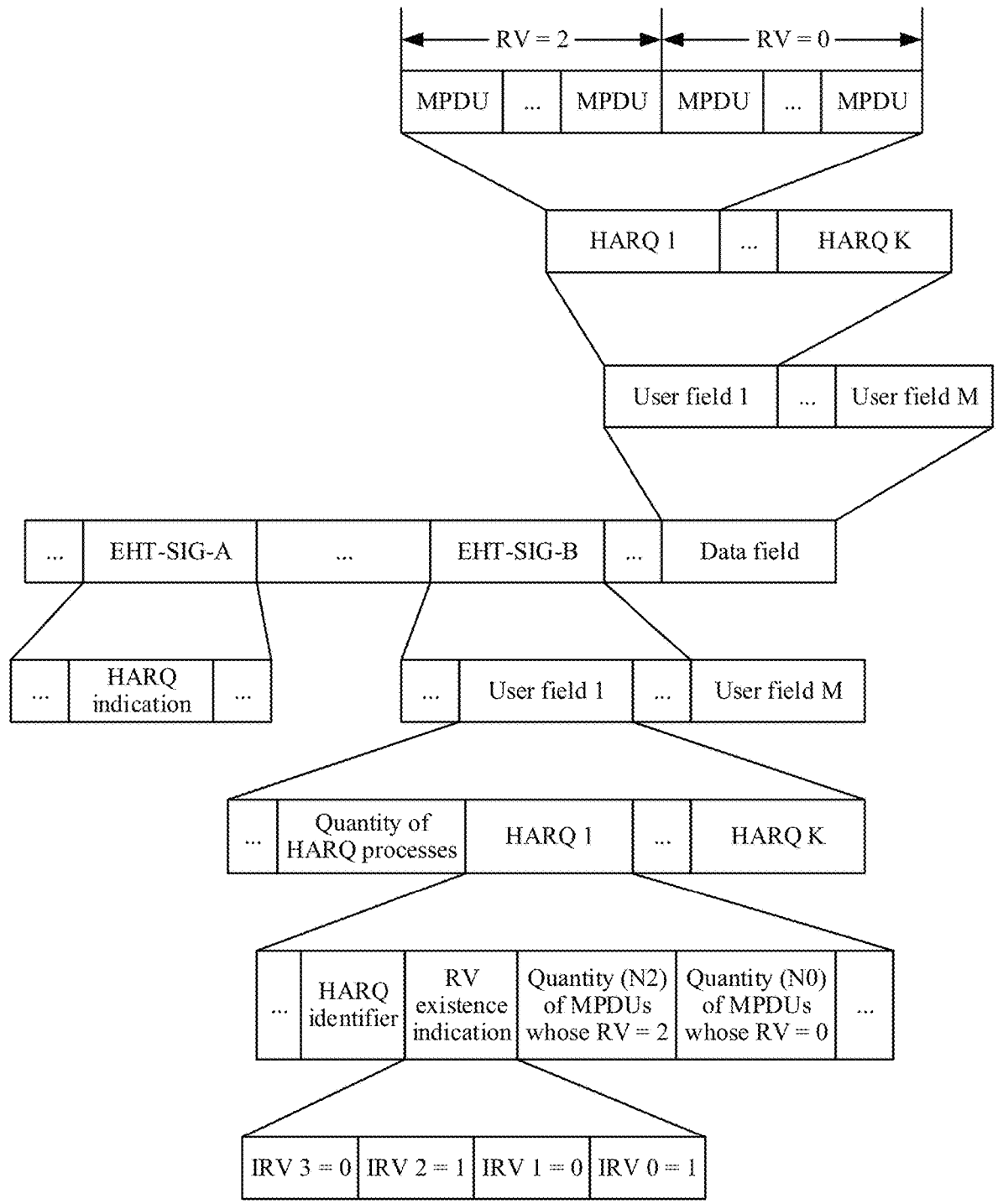
FIG. 15 is a schematic diagram 12 of a structure of a PPDU according to an embodiment of this application.
Figure 16:
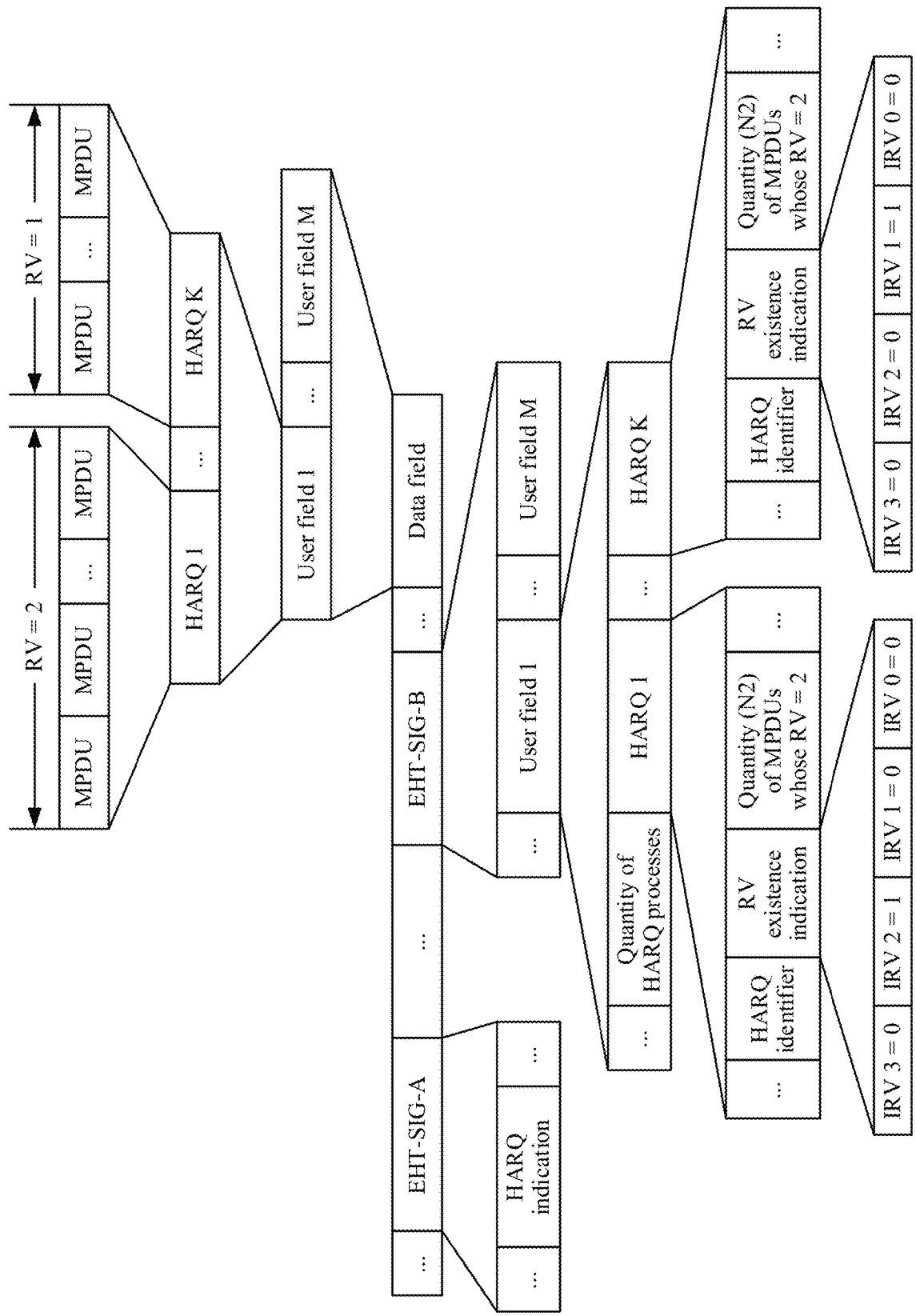
FIG. 16 is a schematic diagram 13 of a structure of a PPDU according to an embodiment of this application.
Figure 17:
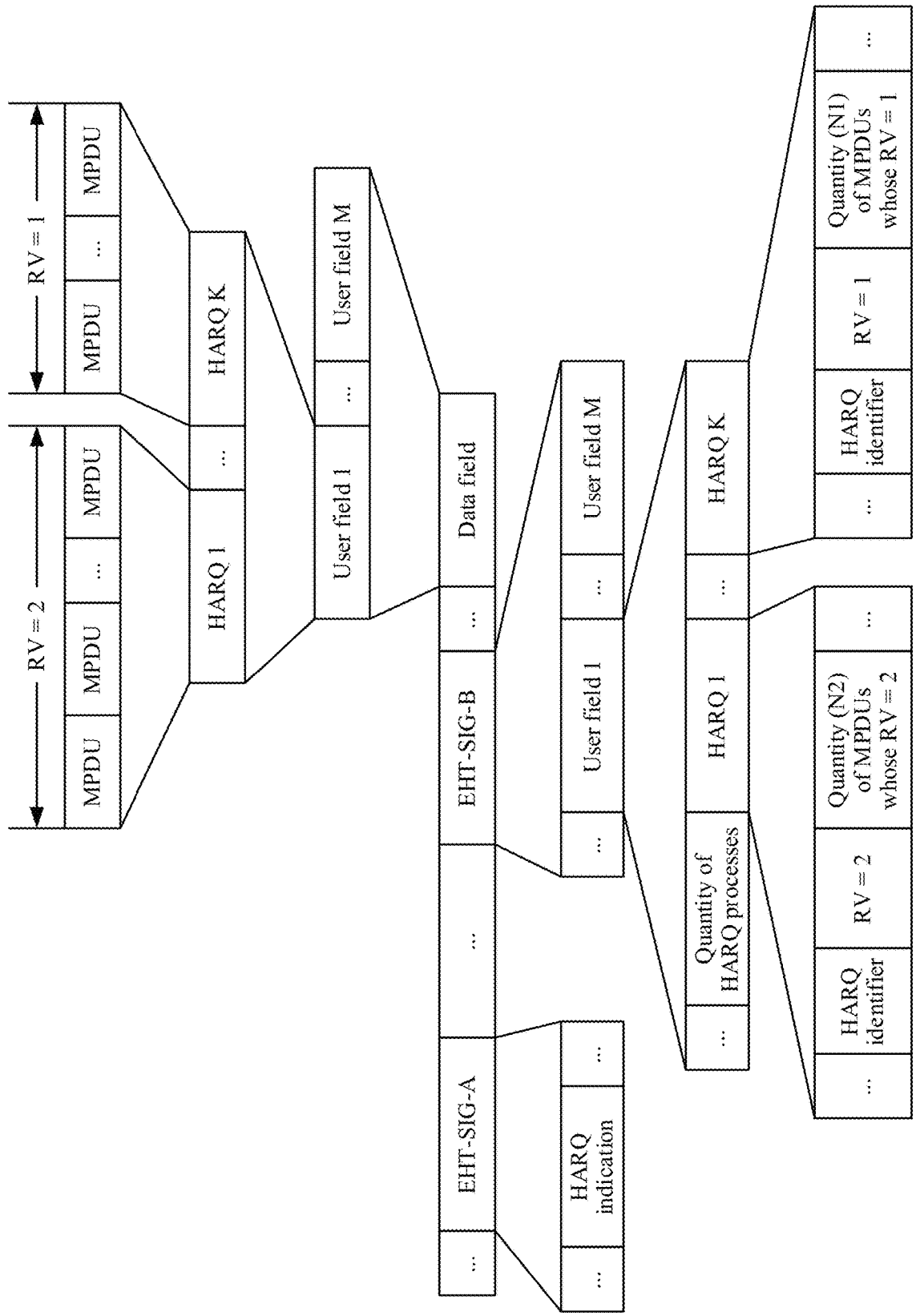
FIG. 17 is a schematic diagram 14 of a structure of a PPDU according to an embodiment of this application.

In FIG. 11, because the RV of the retransmitted MPDU of the user 1 and the RV of the retransmitted MPDU of the user M each have only one value, alternatively a user field in the EHT-SIG-B field may directly carry an RV of a retransmitted MPDU in the PPDU. FIG. 12 is a schematic diagram 9 of a structure of the PPDU according to an embodiment of this application. As shown in FIG. 12, a user field 1 in the EHT-SIG-B field directly carries an RV of 2 of a retransmitted MPDU of a user 1, and a user field M in the EHT-SIG-B field directly carries an RV of 1 of a retransmitted MPDU of a user M, and each RV is 2 bits, so that used signaling and resources are further reduced.

It should be noted that, in a PPDU, data (PSDUs) of different users carried in the data field shown in FIG. 8 to FIG. 12 are not in a strict time sequence. This is because data of different users may be carried in different resource units (resource units, RUs), and different RUs may be located in different frequency domains/time domains/space domains. For example, in the data field shown in FIG. 8, when at least one of frequency domain positions and/or space domain positions in which a user field 1 that carries data of a user 1 and a user field 2 that carries data of a user 2 are located is different, time domain positions in which the user field 1 that carries the data of the user 1 and the user field 2 that carries the data of the user 2 are located may be the same, may be different, or may have an intersection. In other words, the time domain position in which the user field 2 that carries the data of the user 2 is located may be before, after, or overlapping the time domain position in which the user field 1 that carries the data of the user 1 is located.

In the embodiments of this application, for each user, a plurality of MPDUs may exist in a retransmission process at a same time. Therefore, in a possible design method, the PPDU may include a retransmitted MPDU in at least one retransmission process. Correspondingly, the PPDU may include at least one group of RV indication information. One retransmission process corresponds to one group of RV indication information. Optionally, a plurality of retransmission processes may correspond to one group of RV indication information. Optionally, if RVs of all retransmitted MPDUs corresponding to a same retransmission process are the same, the PPDU may include only one piece of RV indication information for the same retransmission process, so that only one RV needs to be transmitted, to further reduce used signaling and resources for transmitting indication information.

For example, FIG. 13 to FIG. 17 are schematic diagrams 10 to 14 that are of structures of a PPDU and that are further expanded based on FIG. 8 to FIG. 12. As shown in FIG. 13 to FIG. 17, an EHT-SIG-B field and a data field of one PPDU may each include a plurality of user fields, for example, M user fields, and each user field may include a total of a plurality of retransmission process fields. For example, a user field 1 includes K retransmission process fields: a HARQ 1, a HARQ 2, . . . , and a HARQ K. The K retransmission process fields in the user field 1 in the data field of the PPDU may be used to carry MPDUs of the K retransmission processes of a user 1 respectively. In addition, the K retransmission process fields in the user field 1 in the EHT-SIG-B field of the PPDU are used to carry RV indication information of K retransmission processes of the user 1. In addition, each user field in the EHT-SIG-B field of the PPDU further carries a quantity of HARQ processes of the user, and each retransmission process field in each user field in the EHT-SIG-B field of the PPDU further carries a HARQ identifier of the retransmission process. For a transmission order of retransmitted MPDUs in each retransmission process and a manner of carrying the RV indication information, refer to FIG. 8 to FIG. 12 and related descriptions. Details are not described herein again.

In still another possible design method, the PPDU may further include one or more newly transmitted MPDUs, and the one or more newly transmitted MPDUs are transmitted after the one or more retransmitted MPDUs.

Optionally, RVs of a plurality of retransmitted MPDUs are the same. In this case, for the plurality of retransmitted MPDUs, only one RV needs to be transmitted, to further reduce used signaling and resources for transmitting indication information.

For example, if RV=0 in Table 1 indicates new transmission, and RV=1, 2, and 3 indicate the $1^{st}$ retransmission, the $2^{nd}$ retransmission, and the $3^{rd}$ retransmission in sequence, Table 1 may be modified to the following Table 3. Correspondingly, the RV indication information of the MPDU whose RV=0 in FIG. 4 to FIG. 17 may alternatively not be transmitted, to further reduce used signaling and resources for transmitting the RV indication information. For a specific implementation, refer to FIG. 4 to FIG. 17 and corresponding descriptions. Details are not described herein again.

As shown in Table 3, there are a total of four RV values: 0, 1, 2, and 3, respectively corresponding to new transmission, the $1^{st}$ retransmission, the $2^{nd}$ retransmission, and the $3^{rd}$ retransmission. The foregoing preset RV order may be: transmitting MPDUs in descending order of the RV values. It is assumed that in previous transmission, an MPDU 1 and an MPDU 2 are retransmitted for the second time, the MPDU 1 is located before the MPDU 2, an MPDU 3 is retransmitted for the first time, an MPDU 4 and an MPDU 5 are newly transmitted, the MPDU 4 is located before the MPDU 5, and the MPDU 1 to the MPDU 5 are all incorrectly transmitted in the previous transmission. In this case, RVs of the MPDU 1 to the MPDU 5 in current transmission are 3, 3, 2, 1, and 1, and a current transmission order is: the MPDU 1, the MPDU 2, the MPDU 3, the MPDU 4, and the MPDU 5.

TABLE 3

| RV | Transmission type |
|---|---|
| 0 | New transmission |
| 1 | The $1^{st}$ retransmission |
| 2 | The $2^{nd}$ retransmission |
| 3 | The $3^{rd}$ retransmission |

It should be noted that, an MPDU correctly transmitted in the previous transmission does not need to be retransmitted in the current transmission, to save resources and improve transmission efficiency. For example, it is assumed that in the previous transmission, the MPDU 2 is correctly transmitted, and the MPDU 1, the MPDU 3, the MPDU 4, and the MPDU 5 are incorrectly transmitted. In this case, a current transmission order is: the MPDU 1, the MPDU 3, the MPDU 4, and the MPDU 5.

It is easily understood that, a maximum quantity of transmissions may be further set. When an MPDU has reached the maximum quantity of transmissions in the previous transmission, the MPDU may be processed based on new transmission in the current transmission, to be specific, an RV of the MPDU is reset to 0. For example, with reference to Table 3, it is assumed that the maximum quantity of transmissions is 4 (corresponding to an RV of 3), in previous transmission, an MPDU 6 is retransmitted for the third time, an MPDU 7 is retransmitted for the second time, an MPDU 8 is retransmitted for the first time, an MPDU 9 is newly transmitted, and the MPDU 6 to the MPDU 9 are all incorrectly transmitted in the previous transmission. In this case, RVs of the MPDU 6 to the MPDU 9 in the current transmission are 0, 3, 2, and 1, and a current transmission order is: the MPDU 7, the MPDU 8, the MPDU 9, and the MPDU 6.

Certainly, if a newly transmitted MPDU still exists in the current transmission, for example, an MPDU 10, in the current transmission, a transmission order of the MPDU 6 to the MPDU 10 may be: the MPDU 7, the MPDU 8, the MPDU 9, the MPDU 6, and the MPDU 10, or may be: the MPDU 7, the MPDU 8, the MPDU 9, the MPDU 10, and the MPDU 6. In other words, an MPDU that reaches the maximum quantity of transmissions in the previous transmission may be processed in the current transmission based on a normal new transmission process, to be specific, the MPDU that reaches the maximum quantity of transmissions in the previous transmission may be located before an MPDU that is actually newly transmitted in the current transmission, or may be located after the MPDU that is actually newly transmitted in the current transmission. This is not limited in this embodiment of this application. The foregoing operations are considered based on the following reasons: For an MPDU that reaches the maximum quantity of transmissions in the previous transmission and that is still incorrect, it may be considered that there are too many previous transmission errors such as poor channel quality, and the second node cannot correctly parse the MPDU for decoding in a combining manner. To be specific, received data of various RVs in the previous transmission of the MPDU has no reference meaning, and cannot be used for decoding in a combining manner with received data in the current transmission of the MPDU. Because both the MPDU and the MPDU that is actually newly transmitted in the current transmission are processed in the new transmission process, the second node does not need to decode the MPDU in a combining manner. Therefore, a transmission order between the MPDU and the MPDU that is actually newly transmitted in the current transmission may not be limited.

It should be noted that, in the correspondences between the RVs and the transmission types shown in Table 1 to Table 3, values of the RVs are sequentially increased in ascending order of quantities of transmissions. It is easily understood that, a correspondence between an RV and a transmission type may alternatively be determined in another manner, provided that values of RVs can distinguish different quantities of transmissions. For example, as shown in Table 4, different values of cyclic codes may alternatively be used as values of RVs to establish a correspondence between an RV and a transmission type.

TABLE 4

| RV | Transmission type |
|---|---|
| 00 | New transmission |
| 01 | The $1^{st}$ retransmission |
| 11 | The $2^{nd}$ retransmission |
| 10 | The $3^{rd}$ retransmission |

It should be noted that the correspondences between the RVs and the transmission types shown in Table 1 to Table 4 may be applied to a scenario in which only a retransmitted MPDU is included, or may be applied to a scenario in which both a retransmitted MPDU and a newly transmitted MPDU exist. This is not limited in the embodiments of this application.

In S302, the first node sends the PPDU. Correspondingly, the second node receives the physical layer protocol data unit (PPDU).

For example, the first node sends the PPDU to the second node over a radio link, for example, an uplink/downlink or a sidelink between the first node and the second node.

In S303, the second node receives the PPDU, and parses the one or more retransmitted MPDUs based on the RV indication information.

For example, the second node may decode MPDUs in a combining manner based on RV indication information of retransmitted MPDUs carried in a signaling field of the PPDU. For a specific implementation, refer to an implementation in a conventional technology. Details are not described in this embodiment of this application again.

It should be noted that, as shown in FIG. 4 to FIG. 17, the EHT-SIG-A may further include a HARQ indication (HARQ indication) field, used to indicate whether the PPDU includes HARQ retransmission. If the indication includes the HARQ retransmission, the RV indication information shown in FIG. 4 to FIG. 17 is carried in the EHT-SIG-B. Otherwise, the RV indication information is not carried, so that signaling overheads and resource overheads are further reduced. The method is applicable to all scenarios that include a HARQ indication field in this application.

According to the communication method provided in an embodiment of this application, when the PPDU sent by the first node includes one or more retransmitted MPDUs, the first node may include, in the PPDU, the RV indication information used to indicate an RV of each retransmitted MPDU, so that a second node receives each retransmitted MPDU based on the RV indication information. This can resolve a problem that retransmitted MPDUs with different RVs cannot be transmitted in a same transmission process, for example, in a same PPDU. This can reduce a quantity of data transmissions, simplify a data transmission scheduling process, and improve data transmission efficiency.

Figure 18:
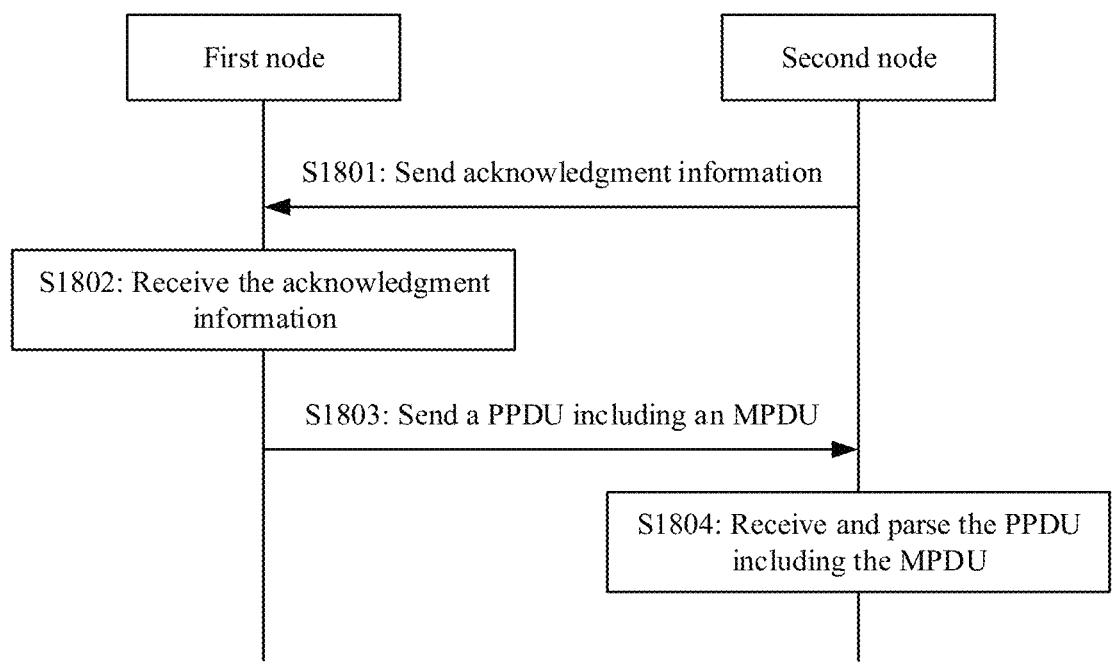
FIG. 18 is a schematic flowchart 2 of a communication method according to an embodiment of this application.

FIG. 18 is a schematic flowchart 2 of a communication method according to an embodiment of this application. The communication method may be applicable to communication between any two nodes shown in FIG. 1. As shown in FIG. 18, the communication method includes the following steps.

S1801: A second node sends acknowledgment information to a first node. The acknowledgment information is used to indicate a media access control protocol data unit MPDU incorrectly transmitted in previous transmission.

For example, the acknowledgment information may be block acknowledgment (block acknowledgment, BA) indication information. The BA indication information may be an acknowledgment (acknowledgment, ACK) or a negative acknowledgment (negative acknowledgment, NACK). For the ACK and the NACK, refer to an implementation in the conventional technology. Details are not described herein again.

S1802: The first node receives the acknowledgment information from the second node.

S1803: The first node sends, to the second node, a physical layer protocol data unit (PPDU) including the MPDU.

A transmission order of the MPDU is determined by a quantity of transmissions of the MPDU and a historical transmission order of the MPDU.

S1804: The second node receives and parses a physical layer protocol data unit (PPDU) that is sent by the first node and that includes the MPDU.

For example, the second node may alternatively determine the transmission order of the MPDU based on the quantity of transmissions of the MPDU and the historical transmission order of the MPDU, and decode the MPDU in a combining manner based on the transmission order.

For example, the MPDU may include a first MPDU and a second MPDU, and the first MPDU is transmitted before the second MPDU in previous transmission. In this case, in a possible design method, that a transmission order of the MPDU is determined by a quantity of transmissions of the MPDU and a historical transmission order of the MPDU may include:

If a quantity of transmissions of the first MPDU does not reach a maximum quantity of transmissions, the first MPDU is transmitted before the second MPDU in current transmission. If a quantity of transmissions of the first MPDU reaches a maximum quantity of transmissions, and a quantity of transmissions of the second MPDU does not reach the maximum quantity of transmissions, the first MPDU is transmitted after the second MPDU in current transmission.

For example, refer to Table 3. It is assumed that the maximum quantity of transmissions is 4, MPDUs are transmitted in descending order of RVs in same transmission. In the previous transmission, the first MPDU is retransmitted for the second time, a corresponding RV=2, the second MPDU is retransmitted for the first time, a corresponding RV=1, and the first MPDU is transmitted before the second MPDU. In the current transmission, an RV corresponding to the first MPDU is 3, an RV corresponding to the second MPDU is 2, and the first MPDU is still transmitted before the second MPDU.

For example, refer to Table 3. It is assumed that the maximum quantity of transmissions is 4, MPDUs are transmitted in descending order of RVs in same transmission. In the previous transmission, the first MPDU is retransmitted for the third time (the first MPDU has reached the maximum quantity of transmissions), a corresponding RV=3, the second MPDU is retransmitted for the first time, a corresponding RV=1, and the first MPDU is transmitted before the second MPDU. In the current transmission, an RV corresponding to the first MPDU is 0, an RV corresponding to the second MPDU is 2, and the first MPDU is transmitted after the second MPDU.

It is easily understood that, the foregoing method for determining the transmission order may alternatively be notified to the second node by using indication information. Therefore, optionally, the PPDU may further include default retransmission indication information. The default retransmission indication information is used to indicate that the transmission order of the MPDU is determined by the quantity of transmissions of the MPDU and the historical transmission order of the MPDU.

Figure 19:
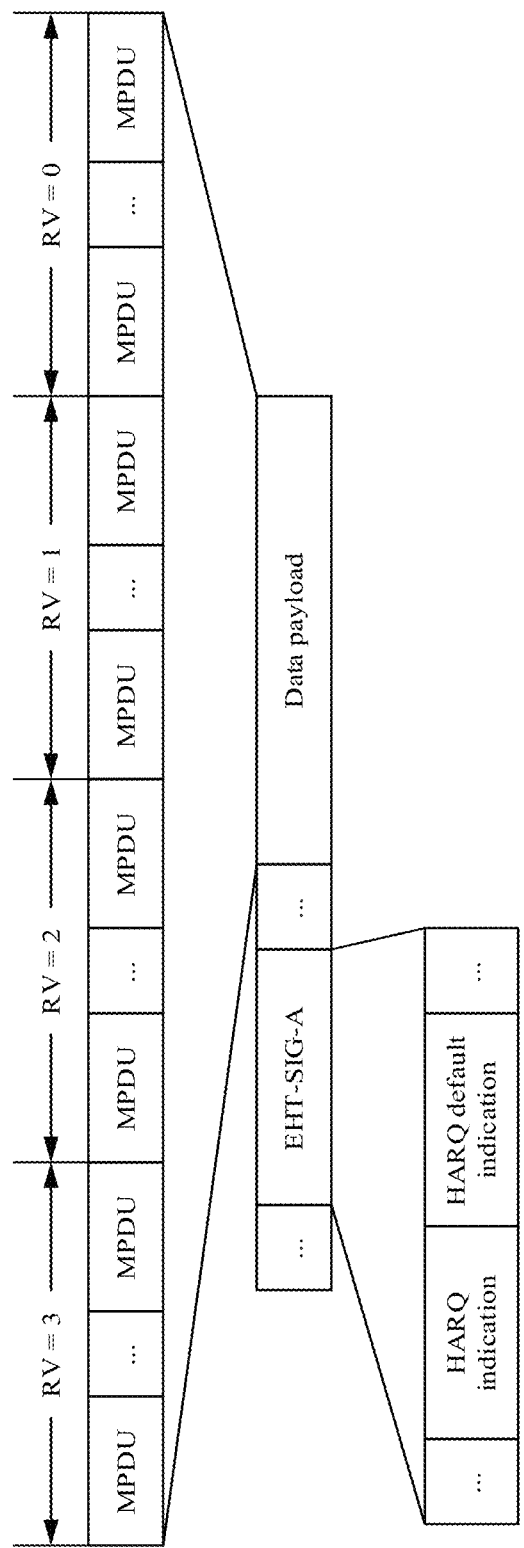
FIG. 19 is a schematic diagram 15 of a structure of a PPDU according to an embodiment of this application.

For example, FIG. 19 is a schematic diagram 15 of a structure of the PPDU according to an embodiment of this application. As shown in FIG. 19, the default retransmission indication information may be carried in a HARQ default (HARQ default) indication field of an EHT-SIG-A field, for example, may be indicated by using a 1-bit (bit) binary number.

In another possible design method, the PPDU further includes redundancy version (RV) indication information of the MPDU, and the RV indication information is used to indicate an RV of the MPDU. The RV indication information is in a one-to-one correspondence with a quantity of retransmissions of the MPDU. It is easily understood that, for content of the RV indication information, refer to the RV indication information in the communication method shown in FIG. 3. Details are not described herein again.

It should be noted that the foregoing default retransmission process is established on a basis in which the first node and the second node have consistent understanding of a data transmission result, for example, how many times the MPDU is transmitted, which redundancy version is transmitted in which transmission, and whether the MPDU is correctly received. However, if the first node does not receive the acknowledgment information sent by the second node, or the second node cannot send the acknowledgment information because the second node cannot correctly parse the signaling field in the PPDU, the first node and the second node have inconsistent understandings of whether the MPDU is correctly transmitted. Consequently, a decoding success rate is reduced.

In addition, the default retransmission indication may be considered as a method for implicitly indicating an RV. It is easily understood that, there are other scenarios in which an RV version of the MPDU needs to be clearly indicated. Detailed descriptions are provided below.

Scenario 1: Resources are insufficient during retransmission, and only some MPDUs can be retransmitted. In this case, some MPDUs that are transmitted first in the historical transmission order are retransmitted based on an order of previously sent MPDUs. In this case, a quantity of retransmitted MPDUs needs to be clearly indicated.

Scenario 2: Different RVs need to be flexibly selected during retransmission. A quantity of transmitted MPDUs corresponding to each type of RV may be specified in sequence based on an order of previously sent MPDUs. For example, it may be specified that an RV of an MPDU with a larger quantity of retransmissions is not less than an RV of an MPDU with a smaller quantity of retransmissions.

Scenario 3: A multiple traffic ID (multiple traffic ID, MTID) aggregation scenario. In this scenario, MPDUs to be retransmitted may be selected based on service priorities. For example, MPDUs with high-priority services may be preferentially transmitted.

Figure 20:
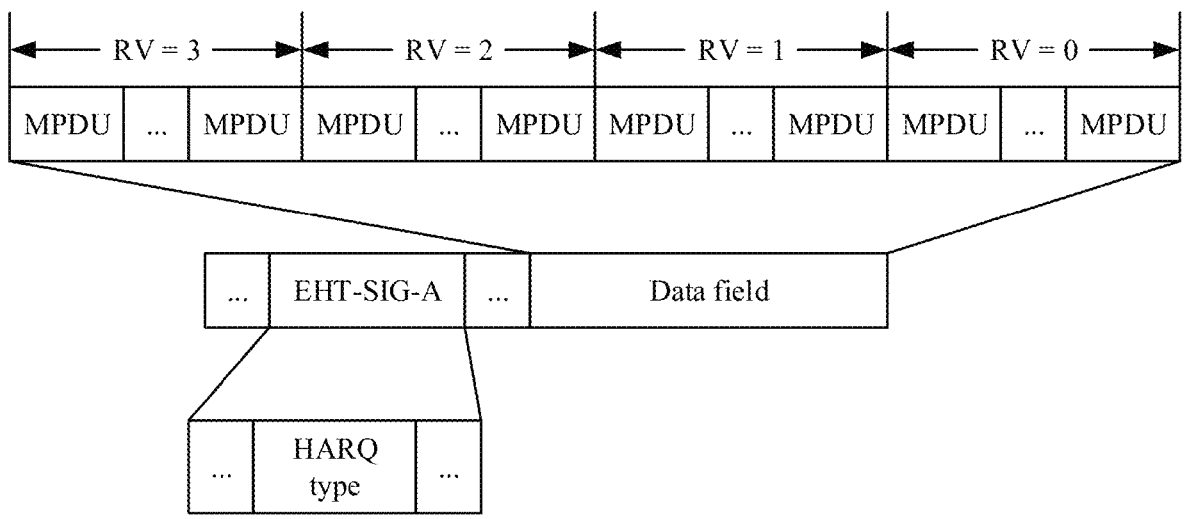
FIG. 20 is a schematic diagram 16 of a structure of a PPDU according to an embodiment of this application.

For example, FIG. 20 is a schematic diagram 16 of a structure of the PPDU according to an embodiment of this application. As shown in FIG. 20, an EHT-SIG-A field in a signaling field of the PPDU includes a HARQ type (HARQ type) field. In the embodiments of this application, the HARQ indication information in FIG. 4 to FIG. 17, and FIG. 19 and the default retransmission indication information in FIG. 19 may further multiplex the HARQ type field in time division. Detailed descriptions are provided below.

Table 5 is an example of a correspondence between a value of a HARQ type and indication information such as the HARQ indication information and the default retransmission indication information according to an embodiment of this application. As shown in Table 5, when the value of the HARQ type is 0, whether the MPDU is newly transmitted or retransmitted, or both newly transmitted and retransmitted, the second node does not decode in a combining manner, in other words, the second node only performs decoding based on data received in current transmission. When the value of the HARQ type is 1, the first node retransmits the MPDU based on the default retransmission process in this embodiment, for example, determines a transmission order and a redundancy version of the retransmitted MPDU. The second node also receives and parses, based on the transmission order and the redundancy version determined in the default retransmission process in this embodiment, the retransmitted MPDU sent by the first node. When the value of the HARQ type is 3, the first node retransmits the MPDU and retransmits RV indication information of the MPDU according to any implementation of the communication method shown in FIG. 3, and the second node decodes the retransmitted MPDU in a combining manner based on the received RV indication information.

TABLE 5

| HARQ type | Applicable scenario | Description |
|---|---|---|
| 0 | Non-decoding scenario | Whether retransmission is performed, decoding in a combining manner is not used. |
| 1 | Default HARQ retransmission scenario | Retransmission based on a default HARQ process |
| 2 | A-MPDU HARQ | Any scenario in the method |

TABLE 5-continued

| HARQ type | Applicable scenario | Description |
|---|---|---|
| | scenario | embodiment shown in FIG. 3 |
| 3 | — | Reserved |

The following uses a few examples for description. It is assumed that the first node determines whether the MPDU needs to be retransmitted and which redundancy version of the MPDU is to be retransmitted according to the following retransmission rule: If the first node receives an ACK, the first node does not retransmit the MPDU. If the first node receives a NACK, the first node retransmits a redundancy version that is of the MPDU and that is determined according to the method shown in Table 5. If the first node does not receive the acknowledgment information (including an ACK and a NACK), the first node resends the MPDU in a new transmission process.

For example, it is assumed that in previous transmission, an MPDU 1 is retransmitted for the first time, and the second node sends an ACK of the MPDU 1, but the first node does not receive the ACK. On one hand, the first node may consider that, the MPDU needs to be resent in the new transmission process in current transmission. On the other hand, the second node may consider that the first node may not resend the MPDU 1 in current transmission, and the second node naturally does not make any preparation for decoding the MPDU 1 in a combining manner again, for example, deleting various redundancy versions of the MPDU 1 received in previous transmissions.

For another example, it is assumed that in previous transmission, an MPDU 2 is retransmitted for the second time, and the second node sends a NACK of the MPDU 2, but the first node does not receive the NACK. On one hand, the first node may consider that, the MPDU needs to be resent in the new transmission process in current transmission. On the other hand, the second node may consider that in current transmission, the first node may resend a redundancy version of RV=3 of the MPDU 2, and prepare to decode the MPDU 2 in a combining manner again based on the redundancy version of RV=3.

To resolve a problem that the first node and the second node have inconsistent understandings of the transmission result of the MPDU, the following technical solution is further introduced in an embodiment of this application. In a possible design method, the PPDU may further include: a retransmission sequence number of the PPDU, a retransmission sequence number of a PSDU or an indication of successful reception of the acknowledgment information. The retransmission sequence number is a sequence number determined according to a sequence number update rule based on a sequence number used by the PPDU or the PSDU in the previous transmission.

Both the retransmission sequence number and the indication of successful reception of the acknowledgment information may be used by the second node to confirm whether the first node successfully receives the acknowledgment information in the previous transmission, to determine whether the first node retransmits the MPDU in current transmission and which redundancy version of the MPDU is retransmitted. The following examples are separately used for description.

With reference to the one-to-one correspondence between the RV and the quantity of transmissions in Table 3, it is assumed that the sequence number update rule is: A retransmission sequence number is a sequence number used in previous transmission+1. For example, it is assumed that for an MPDU 3, a retransmission sequence number of previous transmission corresponds to a redundancy version of RV=1, and a retransmission sequence number of current transmission is the retransmission sequence number of previous transmission plus 1. In this case, the second node may determine that the retransmission sequence number of the current transmission corresponds to a redundancy version of RV=2. For another example, it is assumed that a maximum quantity of transmissions is 4, for an MPDU 4, a retransmission sequence number of previous transmission corresponds to a redundancy version of RV=3, and a retransmission sequence number of current transmission is the retransmission sequence number of previous transmission plus 1. In this case, the second node may determine that the MPDU 4 transmitted in the current transmission is a newly transmitted version, namely, a redundancy version of RV=0.

Figure 21:
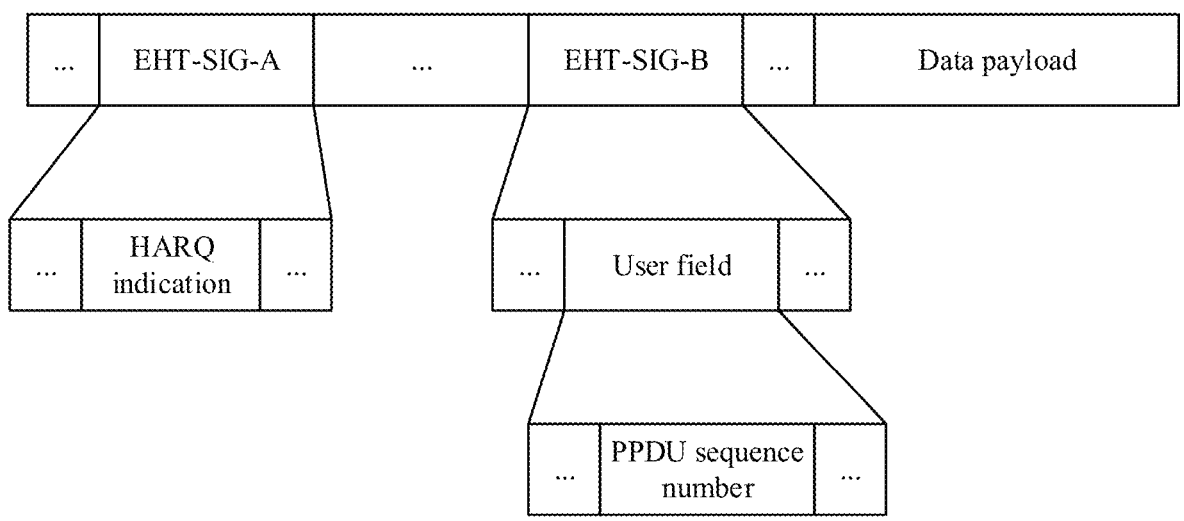
FIG. 21 is a schematic diagram 17 of a structure of a PPDU according to an embodiment of this application.

For example, FIG. 21 is a schematic diagram 17 of a structure of the PPDU according to an embodiment of this application. As shown in FIG. 21, when there is only one user, one PPDU generally includes only one PSDU. Therefore, the retransmission sequence number may be a PPDU sequence number, or may be a PSDU sequence number. The PPDU sequence number or the PSDU sequence number may be carried in a user field of an EHT-SIG-B field.

It is easily understood that, when there are a plurality of users, one PPDU generally includes a plurality of PSDUs, and the retransmission sequence number may be a plurality of PSDU sequence numbers. The plurality of PSDU sequence numbers are in a one-to-one correspondence with the plurality of users. In addition, the plurality of PSDU sequence numbers may be carried in a plurality of user fields of an EHT-SIG-B field, and the plurality of user fields are in a one-to-one correspondence with the plurality of users.

Figure 22:
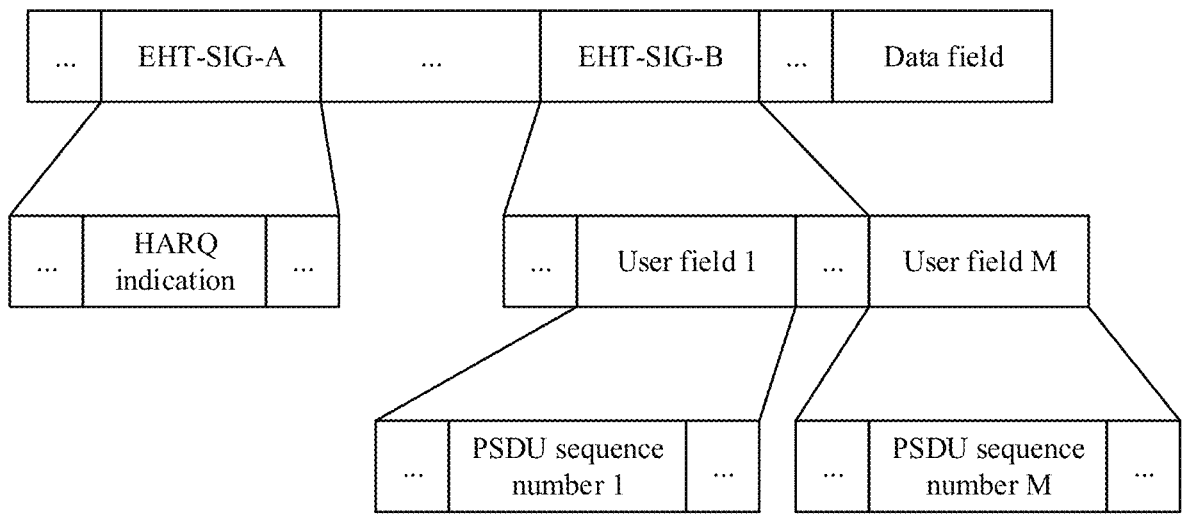
FIG. 22 is a schematic diagram 18 of a structure of a PPDU according to an embodiment of this application.

For example, FIG. 22 is a schematic diagram 18 of a structure of the PPDU according to an embodiment of this application. As shown in FIG. 22, there are a total of M users. Each of the M users is configured with a user field, for example, a user field 1 to a user field M. The M user fields respectively carry PSDU sequence numbers of the M users, for example, a PSDU sequence number 1 to a PSDU sequence number M. When M=1, in other words, when there is only one user, FIG. 22 is the same as FIG. 21.

For example, if reception indication information of acknowledgment information is 1, it indicates that the first node receives a NACK sent by the second node. If reception indication information of acknowledgment information is 0, it indicates that the first node does not receive the acknowledgment information sent by the second node. For example, if the first node does not receive acknowledgment information that is of an MPDU 5 and that is sent by the second node in previous transmission, reception indication information of acknowledgment information of the MPDU 5, carried in the PPDU, sent by the first node is 0 in current transmission. In this case, the second node may decode the MPDU 5 in the new transmission process. For another example, if the first node receives a NACK that is of an MPDU 6 and that is sent by the second node in previous transmission, reception indication information of acknowledgment information of the MPDU 6, carried in the PPDU, sent by the first node is 1 in current transmission. In this case, the second node may determine, based on a quantity of transmissions and a redundancy version of the MPDU 6 sent in the current transmission, for example, determine the redundancy version based on Table 3, and decode the MPDU 5 in a combining manner in the retransmission process.

Figure 23:
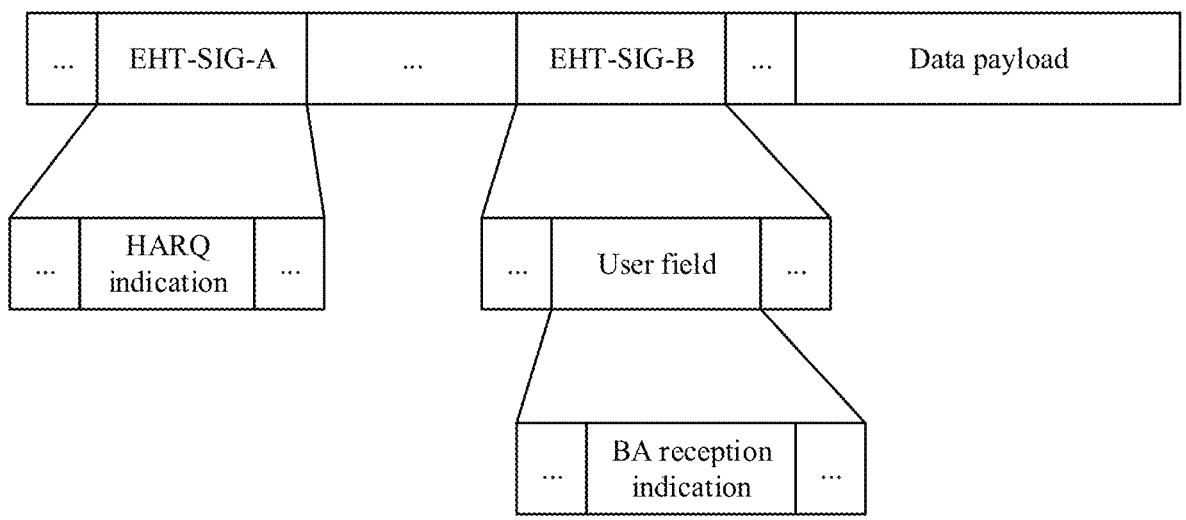
FIG. 23 is a schematic diagram 19 of a structure of a PPDU according to an embodiment of this application.

For example, FIG. 23 is a schematic diagram 19 of a structure of the PPDU according to an embodiment of this application. As shown in FIG. 23, when there is only one user, one PPDU generally includes only one PSDU. Therefore, the foregoing reception indication information of the acknowledgment information may be directly carried in a user field of an EHT-SIG-B field.

It is easily understood that, when there are a plurality of users, one PPDU generally includes a plurality of PSDUs, there may be a plurality of pieces of reception indication information of the acknowledgment information, and the plurality of pieces of reception indication information of the acknowledgment information are in a one-to-one correspondence with the plurality of users. In addition, the plurality of pieces of reception indication information of the acknowledgment information may be separately carried in a plurality of user fields of the EHT-SIG-B field, and the plurality of user fields are in a one-to-one correspondence with the plurality of users.

Figure 24:
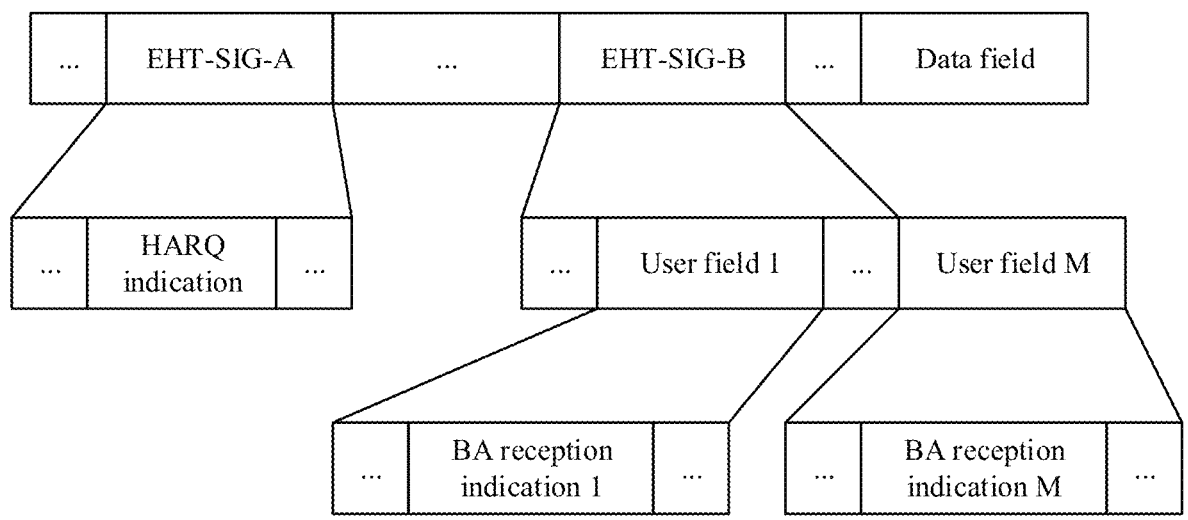
FIG. 24 is a schematic diagram 20 of a structure of a PPDU according to an embodiment of this application.

For example, FIG. 24 is a schematic diagram 20 of a structure of the PPDU according to an embodiment of this application. As shown in FIG. 24, there are a total of M users. The M users each have one user field, for example, a user field 1 to a user field M. The M user fields respectively carry reception indication information of acknowledgment information of the M users. For example, BA reception indication information 1 to BA reception indication information M.

Further, when a plurality of retransmission processes are configured for one user, the retransmission sequence numbers or the reception indication information of the acknowledgment information shown in FIG. 19 to FIG. 24 may be further expanded for the plurality of retransmission processes respectively. For a specific implementation, refer to the processing processes in FIG. 13 to FIG. 17 further expanded from a plurality of retransmission processes based on FIG. 8 to FIG. 12. Details are not described herein again.

Correspondingly, a data field may alternatively carry MPDUs of a plurality of users or MPDUs of a plurality of retransmission processes. In another possible design method, the PPDU may include an MPDU in at least one retransmission process, and the MPDU may be an MPDU in a first retransmission process. The first retransmission process may be any one of the at least one retransmission process.

Optionally, RVs of all MPDUs corresponding to the first retransmission process are the same. In other words, for all MPDUs corresponding to the first retransmission process, only one RV needs to be transmitted, so that used signaling and resources for transmitting indication information can be reduced.

In a possible design method, the PPDU may include an MPDU of at least one user, and the MPDU may be an MPDU of a first user. The first user may be any one of the at least one user.

Optionally, RVs of all MPDUs corresponding to the first user are the same. In other words, for all MPDUs corresponding to the first user, only one RV needs to be transmitted, so that used signaling and resources for transmitting indication information can be reduced.

According to the communication method provided in some embodiments of this application, the first node may learn, based on the acknowledgment information sent by the second node, the MPDU incorrectly transmitted in the previous transmission, and determine the transmission order of the MPDU in the current transmission based on the quantity of transmissions of the MPDU and the historical transmission order of the MPDU. Then, the first node retransmits, to the second node, the MPDU incorrectly transmitted previously. Correspondingly, the second node may alternatively determine the transmission order of the MPDU in the current transmission based on the quantity of transmissions of the MPDU and the historical transmission order of the MPDU, and parse the MPDU retransmitted in the current transmission for decoding in a combining manner. Indication information related to the retransmission order does not need to be transmitted, so that used signaling and resources of the indication information can be reduced.

It should be noted that in the plurality of user-related examples in the foregoing method embodiments, an example in which one user field corresponds to only one PSDU is used to describe a frame format of the PPDU, as shown in FIG. 8 to FIG. 17, FIG. 22, and FIG. 24. In other words, in this case, a plurality of user fields are in a one-to-one correspondence with a plurality of PSDUs. Therefore, a plurality of PSDUs may be indicated by using a plurality of user fields respectively. However, in some other embodiments, one user may alternatively correspond to a plurality of PSDUs. In this case, a plurality of PSDUs of a same user may be indicated by using a plurality of different user fields respectively.

Figure 25:
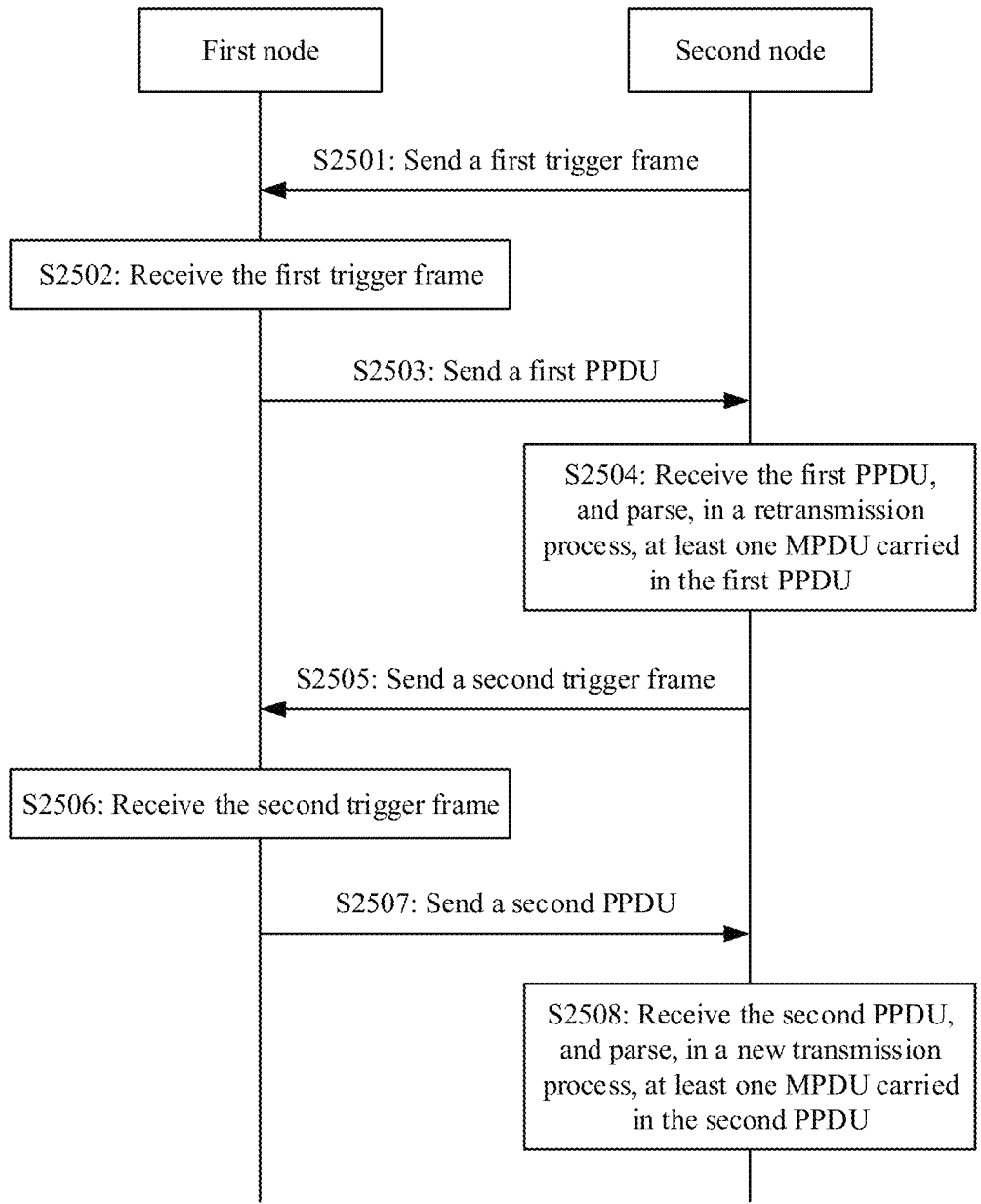
FIG. 25 is a schematic flowchart 3 of a communication method according to an embodiment of this application.

FIG. 25 is a schematic flowchart 3 of a communication method according to an embodiment of this application. The communication method may be applicable to communication between any two nodes shown in FIG. 1 in a first scenario. The first scenario is as follows: When a second node receives a trigger-based PPDU (trigger-based PPDU, TB-PPDU) triggered by the second node, if all MPDUs (in a specific resource unit) sent by a first node are incorrectly decoded, the second node resends RV indication information of RV=0 carried in the trigger-based frame (trigger-based frame, TBF). The RV indication is used to specify that all data carried in the TB-PPDU resent by the first node to the second node uses a new transmission process.

As shown in FIG. 25, the communication method includes the following steps.

S2501: The second node sends a first trigger frame to the first node.

S2502: The first node receives the first trigger frame sent by the second node.

A first RV carried in the first trigger frame is used to indicate the first node to send, in a retransmission process, at least one MPDU incorrectly transmitted previously.

Specifically, the second node may send the first trigger frame to the first node over a sidelink or an uplink/downlink.

Figure 26:
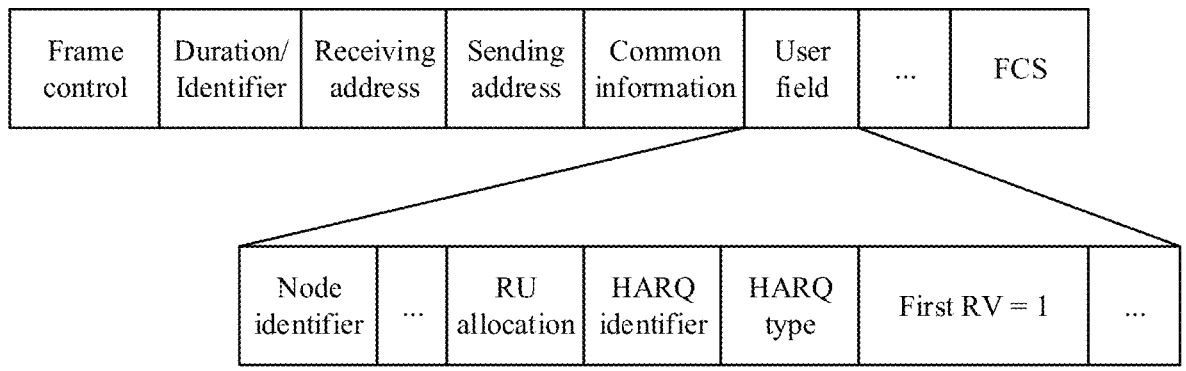
FIG. 26 is a schematic diagram of a structure of a first trigger frame according to an embodiment of this application.

For example, FIG. 26 is a schematic diagram of a structure of the first trigger frame according to an embodiment of this application. As shown in FIG. 26, the first trigger frame includes a user information (user information) field. The user field includes a plurality of fields, such as a node identifier (NID) field, a resource unit allocation (RUA) field, a HARQ identifier (HARQ-ID) field, a reserved field, and a first RV field. The first RV=1, and is used to indicate the first node to send the at least one MPDU in the retransmission process.

In addition, in addition to the user field, the first trigger frame shown in FIG. 26 may further include the following fields: a frame control (FC) field, a duration/identifier (ID) field, a receiving address (RA) field, a transmitting address (TA) field, a common information field, and a frame check sequence (FCS) field. For a specific implementation, refer to an implementation in the conventional technology. Details are not described in this embodiment of this application.

For example, the first node and the second node may be any two terminal devices shown in FIG. 1, or any two network devices, or the first node is any terminal device, and the second node is any network device, or the first node is any network device, and the second node is any terminal device. Device types of the first node and the second node are not limited in this embodiment of this application.

S2503: The first node sends a first PPDU to the second node. The first PPDU carries the at least one MPDU, and the first PPDU is a trigger-based physical layer protocol data unit (trigger-based PPDU, TB-PPDU) generated by the first node in the retransmission process in response to the first RV carried in the first trigger frame.

S2504: The second node receives the first PPDU sent by the first node, and parses, in the retransmission process, the at least one MPDU carried in the first PPDU.

Specifically, the first node may send the first PPDU to the second node over a sidelink or an uplink/downlink. Correspondingly, the second node receives, over the sidelink or the uplink/downlink, the first PPDU sent by the first node. Then, the second node may decode in a combining manner, in the retransmission process, the at least one MPDU carried in the first PPDU. For decoding in a combining manner, refer to an implementation in the conventional technology. Details are not described herein again.

However, if all data carried in the first PPDU is incorrectly decoded, and the second node does not need to decode a signaling field of the first PPDU (because the signaling field is configured by the second node for the first node), the second node cannot learn whether the first node has sent the data. Therefore, when the second node performs scheduling again, the second node can only set the RV to 0, to trigger the second node to resend the data in the new transmission process. In other words, the second node further needs to perform the following S2505.

S2505: The second node sends a second trigger frame to the first node.

A second RV carried in the second trigger frame is used to indicate that all of the at least one MPDU carried in the first PPDU is incorrectly decoded, and indicate the first node to resend the at least one MPDU in the new transmission process.

Specifically, the second node may send the second trigger frame to the first node over a sidelink or an uplink/downlink.

Figure 27:
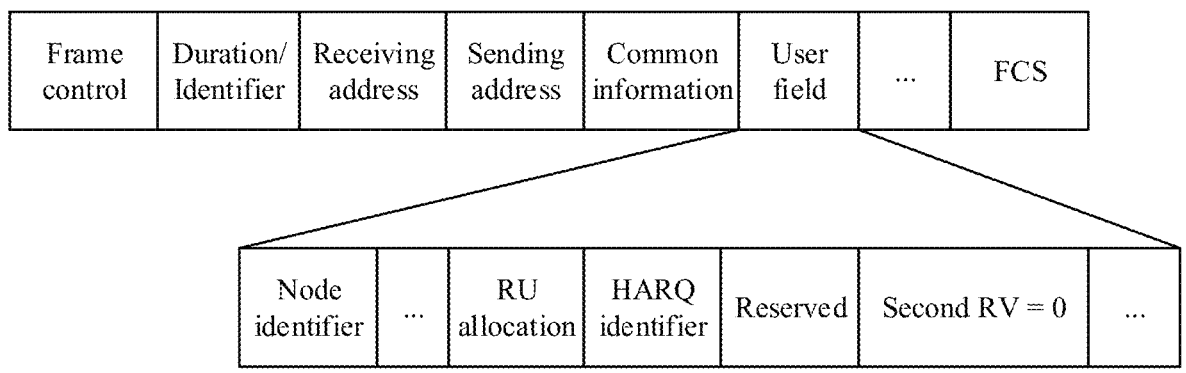
FIG. 27 is a schematic diagram of a structure of a second trigger frame according to an embodiment of this application.

For example, FIG. 27 is a schematic diagram of a structure of the second trigger frame according to an embodiment of this application. For example, as shown in FIG. 27, the trigger frame includes a user (user information) field. The user field includes a plurality of fields, such as a node identifier (NID) field, a resource unit allocation (RUA) field, a HARQ identifier (HARQ-ID) field, a HARQ type (HARQ type) field, and an RV indication information field. The RV indication information is RV=0, and is used to indicate the first node to use the new transmission process when resending the at least one MPDU.

In addition, in addition to the user field, the second trigger frame shown in FIG. 27 may further include the following fields: a frame control (FC) field, a duration/identifier (ID) field, a receiving address (RA) field, a transmitting address (TA) field, a common information field, and a frame check sequence (FCS) field. For a specific implementation, refer to an implementation in the conventional technology. Details are not described in this embodiment of this application.

S2506: The first node receives the second trigger frame sent by the second node.

Specifically, the first node receives, over a sidelink or an uplink/downlink, the second trigger frame sent by the second node.

Then, the first node may generate, in the new transmission process based on the second RV, a second PPDU that carries the at least one MPDU. In other words, the second PPDU is also a TB-PPDU. A redundancy version of the at least one MPDU carried in the second PPDU is a newly transmitted version indicated by the second RV.

Optionally, a signaling field in the second PPDU, for example, an EHT-SIG-A or an EHT-SIG-B, may further carry an RV of the at least one MPDU carried in the second PPDU.

S2507: The first node sends the second PPDU to the second node.

The second PPDU carries the at least one MPDU, and the second PPDU is a TB-PPDU generated by the first node in the new transmission process based on the second RV carried in the second trigger frame sent by the second node.

Specifically, the first node sends the TB-PPDU to the second node over a sidelink or an uplink/downlink.

S2508: The second node receives the second PPDU sent by the first node, and parses, in the new transmission process, the at least one MPDU carried in the second PPDU.

The second PPDU carries the at least one MPDU, and the second PPDU is a TB-PPDU generated by the first node in the new transmission process based on the second RV carried in the second trigger frame sent by the second node.

For a receiving method, refer to S2504. Details are not described herein again.

For example, that the second node parses, in the new transmission process, the at least one MPDU carried in the second PPDU may be: The second node does not parse, the at least one MPDU carried in the second PPDU for decoding in a combining manner, to avoid an adverse impact caused by poor signal quality of the at least one MPDU carried in the first PPDU.

According to the communication method provided in some embodiments of this application, when all of the at least one MPDU carried in the first PPDU sent by the first node in the retransmission process is incorrectly transmitted, the first node may resend the at least one MPDU in the new transmission process based on the second RV carried in the second trigger frame sent by the second node. This can avoid a problem that: When all of the at least one MPDU carried in the first PPDU sent by the first node in the retransmission process is incorrectly transmitted, the second node does not parse a signaling field of the first PPDU, and therefore cannot learn whether the first node has sent the MPDU; as a result, two nodes have different understandings about whether the at least one MPDU is successfully transmitted, then the first node no longer sends the at least one MPDU, and data is lost, or the first node still sends the at least one MPDU in the retransmission process, but the second node cannot decode the at least one retransmitted MPDU in a combining manner because the second node does not receive a historical redundancy version of the at least one MPDU. This can improve a decoding success rate and data transmission reliability.

The communication methods provided in the embodiments of this application are described above in detail with reference to FIG. 3 to FIG. 27. The following describes in detail communication apparatuses provided in the embodiments of this application with reference to FIG. 28 to FIG. 33.

Figure 28:
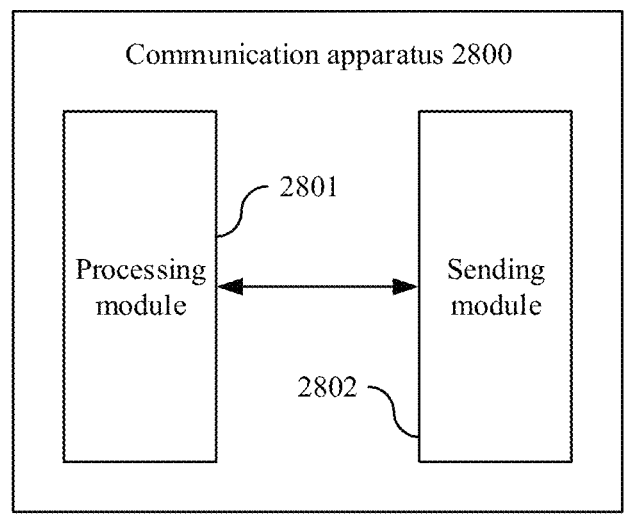
FIG. 28 is a schematic diagram 2 of a structure of a communication apparatus according to an embodiment of this application.

FIG. 28 is a schematic diagram 2 of a structure of a communication apparatus according to an embodiment of this application. The communication apparatus may be applied to the communication system shown in FIG. 1, and performs a function of the first node in the communication method shown in FIG. 3. For ease of description, FIG. 28 shows only main components of the communication apparatus.

As shown in FIG. 28, the communication apparatus 2800 includes a processing module 2801 and a sending module 2802.

The processing module 2801 is configured to generate a physical layer protocol data unit (PPDU). The PPDU includes redundancy version (RV) indication information and one or more retransmitted media access control protocol data units (MPDUs), and the RV indication information is used to indicate RVs of the one or more retransmitted MPDUs. The sending module 2802 is configured to send the PPDU.

In a possible design, different retransmitted MPDUs corresponding to different RVs are transmitted in a preset RV order, and/or different retransmitted MPDUs corresponding to a same RV are transmitted in a historical transmission order. Optionally, the transmission order may be indicated by using 1-bit (bit) indication information, or may not be indicated, but is preconfigured on a first node and a second node.

In a possible design, the RV indication information may include a total quantity of retransmitted MPDUs in the PPDU and an RV of each retransmitted MPDU. Each retransmitted MPDU has one RV used to indicate a redundancy version of the retransmitted MPDU.

In another possible design, the RVs of the one or more retransmitted MPDUs belong to a preset RV set, the preset RV set may include one or more types of preset RVs, and the RV indication information may include a quantity of retransmitted MPDUs corresponding to each type of preset RV in the PPDU. The preset RV set may be a candidate RV set including all or some RVs specified in a protocol, and may be dynamically configured by a network by using signaling, or may be preconfigured on the first node and the second node.

Optionally, the RV indication information may further include a total quantity of retransmitted MPDUs in the PPDU, so that the second node checks whether transmission of the quantity of retransmitted MPDUs corresponding to each type of preset RV in the PPDU is correct, to improve reliability of transmission of the indication information.

In still another possible design, the RV indication information may include an RV in the PPDU and a quantity of retransmitted MPDUs corresponding to each type of RV. For example, the RV in the PPDU may be indicated by using a bitmap (bitmap) manner. It is easily understood that, the bitmap indicates that a quantity of retransmitted MPDUs corresponding to an RV that does not exist is 0. Therefore, the quantity of retransmitted MPDUs corresponding to the RV does not need to be transmitted, to reduce used signaling and resources.

In still another possible design, the PPDU may further include one or more newly transmitted MPDUs, and the one or more newly transmitted MPDUs are transmitted after the one or more retransmitted MPDUs. Optionally, RVs of a plurality of retransmitted MPDUs are the same. In this case, for the plurality of retransmitted MPDUs, only one RV needs to be transmitted, to further reduce used signaling and resources for transmitting indication information.

In a possible design method, the PPDU may include a retransmitted MPDU in at least one retransmission process. Correspondingly, the PPDU may include at least one group of RV indication information. One retransmission process corresponds to one group of RV indication information. Optionally, a plurality of retransmission processes may correspond to one group of RV indication information. Optionally, if RVs of all retransmitted MPDUs corresponding to a same retransmission process are the same, the PPDU may include only one piece of RV indication information for the same retransmission process, so that only one RV needs to be transmitted, to further reduce used signaling and resources for transmitting indication information.

In a possible design method, the PPDU may include an MPDU of at least one user. Correspondingly, the PPDU may include at least one group of RV indication information. One user corresponds to one group of RV indication information. Optionally, a plurality of users may correspond to one group of RV indication information. Optionally, if RVs of all retransmitted MPDUs corresponding to a same user are the same, the PPDU may include only one piece of RV indication information for the same user, so that only one RV needs to be transmitted, to further reduce used signaling and resources for transmitting indication information.

Optionally, the communication apparatus 2800 shown in FIG. 28 may further include a storage module (not shown in FIG. 28). The storage module stores a program or instructions. When the processing module 2801 executes the program or the instructions, the communication apparatus 2800 is enabled to perform a function of the first node in the communication method shown in FIG. 3.

Optionally, the communication apparatus 2800 shown in FIG. 28 may further include a receiving module (not shown in FIG. 28), so that the communication apparatus 2800 can also receive a signal sent by another communication apparatus, such as the second node in the communication method shown in FIG. 3, to implement bidirectional communication.

It should be noted that the communication apparatus 2800 may be any terminal device or any network device shown in FIG. 1, or the communication apparatus 200 shown in FIG. 2, or may be a chip or a chip system disposed in the terminal device, the network device, or the communication apparatus 200. This is not limited in this embodiment of this application.

For technical effects of the communication apparatus 2800, refer to technical effects of the communication method shown in FIG. 3. Details are not described herein again.

Figure 29:
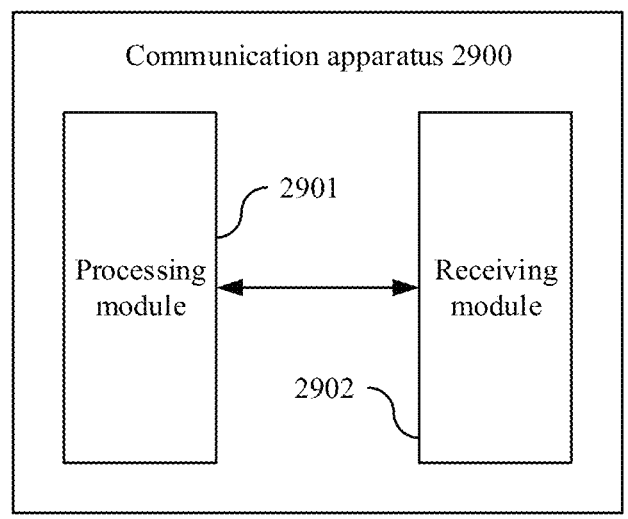
FIG. 29 is a schematic diagram 3 of a structure of a communication apparatus according to an embodiment of this application.

FIG. 29 is a schematic diagram 3 of a structure of a communication apparatus according to an embodiment of this application. The communication apparatus may be applied to the communication system shown in FIG. 1, and performs a function of the second node in the communication method shown in FIG. 3. For ease of description, FIG. 29 shows only main components of the communication apparatus.

As shown in FIG. 29, the communication apparatus 2900 includes a processing module 2901 and a receiving module 2902.

The receiving module 2902 is configured to receive a physical layer protocol data unit (PPDU). The PPDU includes redundancy version (RV) indication information and one or more retransmitted media access control protocol data units (MPDUs), and the RV indication information is used to indicate RVs of the one or more retransmitted MPDUs. The processing module 2901 is configured to parse the one or more retransmitted MPDUs based on the RV indication information.

In a possible design, different retransmitted MPDUs corresponding to different RVs are transmitted in a preset RV order, and/or different retransmitted MPDUs corresponding to a same RV are transmitted in a historical transmission order. Optionally, the transmission order may be indicated by using 1-bit (bit) indication information, or may not be indicated, but is preconfigured on a first node and a second node.

In a possible design, the RV indication information may include a total quantity of retransmitted MPDUs in the PPDU and an RV of each retransmitted MPDU. Each retransmitted MPDU has one RV used to indicate a redundancy version of the retransmitted MPDU.

In another possible design, the RVs of the one or more retransmitted MPDUs belong to a preset RV set, the preset RV set may include one or more types of preset RVs, and the RV indication information may include a quantity of retransmitted MPDUs corresponding to each type of preset RV in the PPDU. The preset RV set may be a candidate RV set including all or some RVs specified in a protocol, and may be dynamically configured by a network by using signaling, or may be preconfigured on the first node and the second node.

Optionally, the RV indication information may further include a total quantity of retransmitted MPDUs in the PPDU, so that the second node checks whether transmission of the quantity of retransmitted MPDUs corresponding to each type of preset RV in the PPDU is correct, to improve reliability of transmission of the indication information.

In still another possible design, the RV indication information may include an RV in the PPDU and a quantity of retransmitted MPDUs corresponding to each type of RV. For example, the RV in the PPDU may be indicated by using a bitmap (bitmap) manner. It is easily understood that, the bitmap indicates that a quantity of retransmitted MPDUs corresponding to an RV that does not exist is 0. Therefore, the quantity of retransmitted MPDUs corresponding to the RV does not need to be transmitted, to reduce used signaling and resources.

In still another possible design, the PPDU may further include one or more newly transmitted MPDUs, and the one or more newly transmitted MPDUs are transmitted after the one or more retransmitted MPDUs. Optionally, RVs of a plurality of retransmitted MPDUs are the same. In this case, for the plurality of retransmitted MPDUs, only one RV needs to be transmitted, to further reduce used signaling and resources for transmitting indication information.

In a possible design, the PPDU may include a retransmitted MPDU in at least one retransmission process. Correspondingly, the RV indication information may include at least one group of RV indication information. The at least one group of RV indication information is in a one-to-one correspondence with the at least one retransmission process. Optionally, RVs of all retransmitted MPDUs corresponding to a same retransmission process are the same. In this case, only one RV needs to be transmitted, to further reduce used signaling and resources for transmitting indication information.

In a possible design, the PPDU may include an MPDU of at least one user. Correspondingly, the RV indication information may include at least one group of RV indication information. The at least one group of RV indication information is in a one-to-one correspondence with the at least one user. Optionally, RVs of all retransmitted MPDUs corresponding to a same user are the same. In this case, only one RV needs to be transmitted, to further reduce used signaling and resources for transmitting indication information.

Optionally, the communication apparatus 2900 shown in FIG. 29 may further include a storage module (not shown in FIG. 29). The storage module stores a program or instructions. When the processing module 2901 executes the program or the instructions, the communication apparatus 2900 is enabled to perform a function of the second node in the communication method shown in FIG. 3.

Optionally, the communication apparatus 2900 shown in FIG. 29 may further include a sending module (not shown in FIG. 29), so that the communication apparatus 2900 can also send a signal to another communication apparatus, such as the second node in the communication method shown in FIG. 3, to implement bidirectional communication.

It should be noted that the communication apparatus 2900 may be any terminal device or any network device shown in FIG. 1, or the communication apparatus 200 shown in FIG. 2, or may be a chip or a chip system disposed in the terminal device, the network device, or the communication apparatus 200. This is not limited in this embodiment of this application.

For technical effects of the communication apparatus 2900, refer to technical effects of the communication method shown in FIG. 3. Details are not described herein again.

Figure 30:
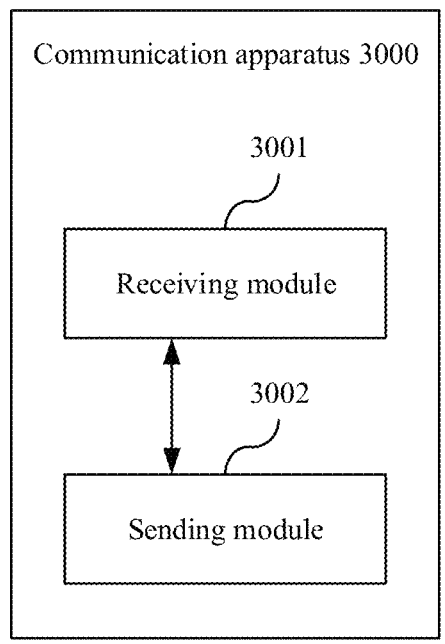
FIG. 30 is a schematic diagram 4 of a structure of a communication apparatus according to an embodiment of this application.

FIG. 30 is a schematic diagram 4 of a structure of a communication apparatus according to an embodiment of this application. The communication apparatus may be applied to the communication system shown in FIG. 1, and performs a function of the first node in the communication method shown in FIG. 18. For ease of description, FIG. 30 shows only main components of the communication apparatus.

As shown in FIG. 30, the communication apparatus 3000 includes a receiving module 3001 and a sending module 3002.

The receiving module 3001 is configured to receive acknowledgment information from a second node. The acknowledgment information is used to indicate a media access control protocol data unit MPDU incorrectly transmitted in previous transmission. The sending module 3002 is configured to send, to the second node, a physical layer protocol data unit (PPDU) including the MPDU. A transmission order of the MPDU is determined by a quantity of transmissions of the MPDU and a historical transmission order of the MPDU.

For example, the MPDU may include a first MPDU and a second MPDU, and the first MPDU is transmitted before the second MPDU in the previous transmission. In a possible design, that a transmission order of the MPDU is determined by a quantity of transmissions of the MPDU and a historical transmission order of the MPDU may include: If a quantity of transmissions of the first MPDU does not reach a maximum quantity of transmissions, the first MPDU is transmitted before the second MPDU in current transmission. If a quantity of transmissions of the first MPDU reaches a maximum quantity of transmissions, and a quantity of transmissions of the second MPDU does not reach the maximum quantity of transmissions, the first MPDU is transmitted after the second MPDU in current transmission.

Optionally, the PPDU may further include default retransmission indication information. The default retransmission indication information is used to indicate that the transmission order of the MPDU is determined by the quantity of transmissions of the MPDU and the historical transmission order of the MPDU.

In a possible design, the PPDU may further include a retransmission sequence number of the MPDU or an indication of successful reception of the acknowledgment information. The retransmission sequence number is a sequence number determined according to a sequence number update rule based on a sequence number used by the MPDU in the previous transmission.

In another possible design, the PPDU further includes redundancy version (RV) indication information of the MPDU, and the RV indication information is used to indicate an RV of the MPDU. The RV indication information is in a one-to-one correspondence with a quantity of retransmissions of the MPDU.

In a possible design, the PPDU may include an MPDU in at least one retransmission process, and the MPDU may be an MPDU in a first retransmission process. The first retransmission process may be any one of the at least one retransmission process.

Optionally, RVs of all MPDUs corresponding to the first retransmission process are the same. In other words, for all MPDUs corresponding to the first retransmission process, only one RV needs to be transmitted, so that used signaling and resources for transmitting indication information can be reduced.

In a possible design, the PPDU may include an MPDU of at least one user, and the MPDU may be an MPDU of a first user. The first user may be any one of the at least one user.

Optionally, RVs of all MPDUs corresponding to the first user are the same. In other words for all MPDUs corresponding to the first user, only one RV needs to be transmitted, so that used signaling and resources for transmitting indication information can be reduced.

Optionally, the communication apparatus shown in FIG. 30 may further include a processing module (not shown in FIG. 30), so that the communication apparatus 3000 learns, based on the acknowledgment information sent by the second node, the MPDU incorrectly transmitted in the previous transmission, and generates, in current transmission, a PPDU used to carry the MPDU incorrectly transmitted previously.

Optionally, the communication apparatus 3000 shown in FIG. 30 may further include a storage module (not shown in FIG. 30). The storage module stores a program or instructions. When the processing module executes the program or the instructions, the communication apparatus 3000 is enabled to perform a function of the first node in the communication method shown in FIG. 18.

It should be noted that the communication apparatus 3000 may be any terminal device or any network device shown in FIG. 1, or the communication apparatus 200 shown in FIG. 2, or may be a chip or a chip system disposed in the terminal device, the network device, or the communication apparatus 200. This is not limited in this embodiment of this application.

For technical effects of the communication apparatus 3000, refer to technical effects of the communication method shown in FIG. 18. Details are not described herein again.

Figure 31:
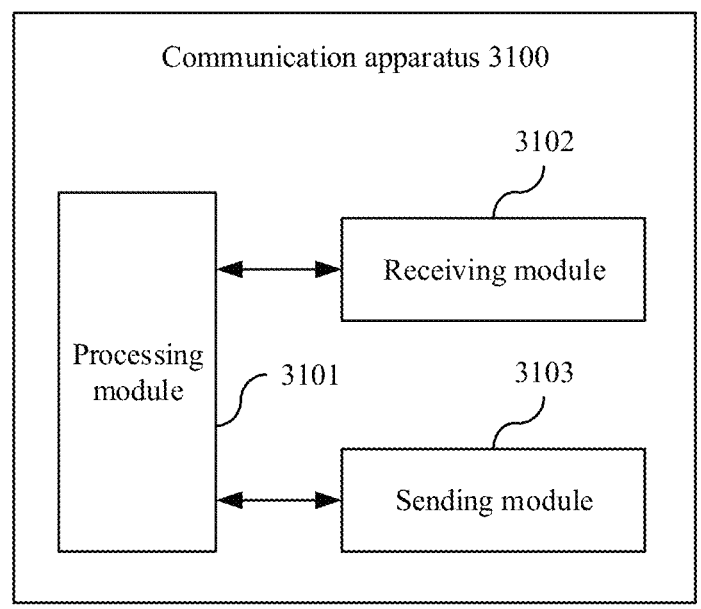
FIG. 31 is a schematic diagram 5 of a structure of a communication apparatus according to an embodiment of this application.

FIG. 31 is a schematic diagram 5 of a structure of a communication apparatus according to an embodiment of this application. The communication apparatus may be applied to the communication system shown in FIG. 1, and performs a function of the second node in the communication method shown in FIG. 18. For ease of description, FIG. 31 shows only main components of the communication apparatus.

As shown in FIG. 31, the communication apparatus 3100 includes a processing module 3101, a receiving module 3102, and a sending module 3103.

The sending module 3103 is configured to send acknowledgment information to a first node. The acknowledgment information is used to indicate a media access control protocol data unit MPDU incorrectly transmitted in previous transmission.

The receiving module 3102 is configured to receive a physical layer protocol data unit (PPDU) that is sent by the first node and that includes the MPDU. A transmission order of the MPDU is determined by a quantity of transmissions of the MPDU and a historical transmission order of the MPDU.

The processing module 3101 is configured to parse the MPDU.

For example, the MPDU may include a first MPDU and a second MPDU, and the first MPDU is transmitted before the second MPDU in the previous transmission. In a possible design, that a transmission order of the MPDU is determined by a quantity of transmissions of the MPDU and a historical transmission order of the MPDU may include: If a quantity of transmissions of the first MPDU does not reach a maximum quantity of transmissions, the first MPDU is transmitted before the second MPDU in current transmission. If a quantity of transmissions of the first MPDU reaches a maximum quantity of transmissions, and a quantity of transmissions of the second MPDU does not reach the maximum quantity of transmissions, the first MPDU is transmitted after the second MPDU in current transmission.

Optionally, the PPDU may further include default retransmission indication information. The default retransmission indication information is used to indicate that the transmission order of the MPDU is determined by the quantity of transmissions of the MPDU and the historical transmission order of the MPDU.

In a possible design, the PPDU may further include a retransmission sequence number of the MPDU or an indication of successful reception of the acknowledgment information. The retransmission sequence number is a sequence number determined according to a sequence number update rule based on a sequence number used by the MPDU in the previous transmission.

In another possible design, the PPDU further includes redundancy version (RV) indication information of the MPDU, and the RV indication information is used to indicate an RV of the MPDU. The RV indication information is in a one-to-one correspondence with a quantity of retransmissions of the MPDU.

In a possible design, the PPDU may include an MPDU in at least one retransmission process, and the MPDU may be an MPDU in a first retransmission process. The first retransmission process may be any one of the at least one retransmission process.

Optionally, RVs of all MPDUs corresponding to the first retransmission process are the same. In other words, for all MPDUs corresponding to the first retransmission process, only one RV needs to be transmitted, so that used signaling and resources for transmitting indication information can be reduced.

In a possible design, the PPDU may include an MPDU of at least one user, and the MPDU may be an MPDU of a first user. The first user may be any one of the at least one user.

Optionally, RVs of all MPDUs corresponding to the first user are the same. In other words, for all MPDUs corresponding to the first user, only one RV needs to be transmitted, so that used signaling and resources for transmitting indication information can be reduced.

Optionally, the communication apparatus 3100 shown in FIG. 31 may further include a storage module (not shown in FIG. 31). The storage module stores a program or instructions. When the processing module 3101 executes the program or the instructions, the communication apparatus 3100 is enabled to perform a function of the second node in the communication method shown in FIG. 18.

It should be noted that the communication apparatus 3100 may be any terminal device or any network device shown in FIG. 1, or the communication apparatus 200 shown in FIG. 2, or may be a chip or a chip system disposed in the terminal device, the network device, or the communication apparatus 200. This is not limited in this embodiment of this application.

For technical effects of the communication apparatus 3100, refer to technical effects of the communication method shown in FIG. 18. Details are not described herein again.

Figure 32:
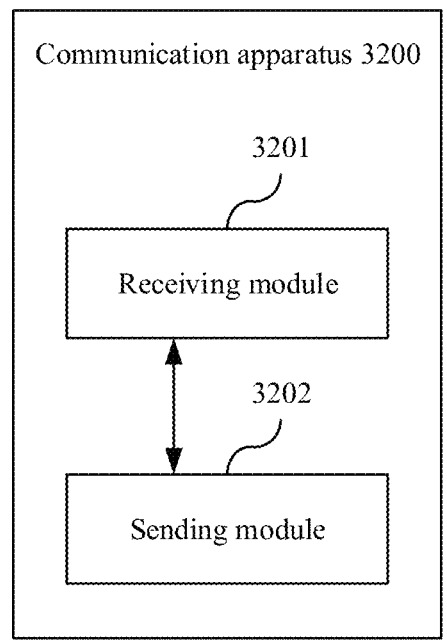
FIG. 32 is a schematic diagram 6 of a structure of a communication apparatus according to an embodiment of this application.

FIG. 32 is a schematic diagram 6 of a structure of a communication apparatus according to an embodiment of this application. The communication apparatus may be applied to the communication system shown in FIG. 1, and performs a function of the first node in the communication method shown in FIG. 25. For ease of description, FIG. 32 shows only main components of the communication apparatus.

As shown in FIG. 32, the communication apparatus 3200 includes a receiving module 3201 and a sending module 3202.

The receiving module 3201 is configured to receive a first trigger frame sent by a second node. A first RV carried in the first trigger frame is used to indicate the first node to send, in a retransmission process, at least one MPDU incorrectly transmitted previously. The sending module 3202 is configured to send a first PPDU to the second node. The first PPDU carries the at least one MPDU, and the first PPDU is a TB-PPDU generated by the first node in the retransmission process in response to the first RV carried in the first trigger frame. The receiving module 3201 is further configured to receive a second trigger frame sent by the second node. A second RV carried in the second trigger frame is used to indicate that all of the at least one MPDU is incorrectly decoded, and indicate the first node to resend the at least one MPDU in a new transmission process. The sending module 3202 is further configured to send a second PPDU to the second node by the first node. The second PPDU carries the at least one MPDU, and the second PPDU is a TB-PPDU generated by the first node in the new transmission process based on the second RV carried in the second trigger frame sent by the second node.

Optionally, the communication apparatus 3200 shown in FIG. 32 may further include a processing module (not shown in FIG. 32), so that the communication apparatus 3200 generates, based on RV indication information sent by the second node, a PPDU used to carry a specified redundancy version of the MPDU incorrectly transmitted in the previous transmission.

Optionally, the communication apparatus 3200 shown in FIG. 32 may further include a storage module (not shown in FIG. 32). The storage module stores a program or instructions. When the processing module executes the program or the instructions, the communication apparatus 3200 is enabled to perform a function of the first node in the communication method shown in FIG. 25.

It should be noted that the communication apparatus 3200 may be any terminal device or any network device shown in FIG. 1, or the communication apparatus 200 shown in FIG. 2, or may be a chip or a chip system disposed in the terminal device, the network device, or the communication apparatus 200. This is not limited in this embodiment of this application.

For technical effects of the communication apparatus 3200, refer to technical effects of the communication method shown in FIG. 25. Details are not described herein again.

Figure 33:
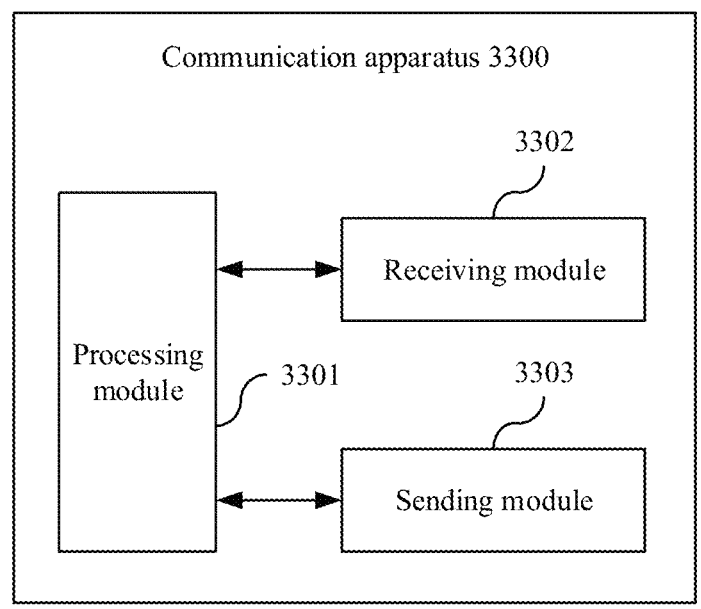
FIG. 33 is a schematic diagram 7 of a structure of a communication apparatus according to an embodiment of this application.

FIG. 33 is a schematic diagram 7 of a structure of a communication apparatus according to an embodiment of this application. The communication apparatus may be applied to the communication system shown in FIG. 1, and performs a function of the second node in the communication method shown in FIG. 25. For ease of description, FIG. 33 shows only main components of the communication apparatus.

As shown in FIG. 33, the communication apparatus 3300 includes a processing module 3301, a receiving module 3302, and a sending module 3303.

The sending module 3303 is configured to send a first trigger frame to a first node. A first RV carried in the first trigger frame is used to indicate the first node to send, in a retransmission process, at least one MPDU incorrectly transmitted previously. The receiving module 3302 is configured to receive a first PPDU sent by the first node. The processing module 3301 is configured to parse, in the retransmission process, at least one MPDU carried in the first PPDU. The first PPDU carries the at least one MPDU, and the first PPDU is a TB-PPDU generated by the first node in the retransmission process in response to the first RV carried in the first trigger frame. The sending module 3303 is further configured to send a second trigger frame to the first node. A second RV carried in the second trigger frame is used to indicate that all of the at least one MPDU is incorrectly decoded, and indicate the first node to resend the at least one MPDU in a new transmission process. The receiving module 3302 is further configured to receive a second PPDU sent by the first node. The processing module 3301 is further configured to parse, in the new transmission process, at least one MPDU carried in the second PPDU. The second PPDU carries the at least one MPDU, and the second PPDU is a TB-PPDU generated by the first node in the new transmission process based on the second RV carried in the second trigger frame sent by a second node.

Optionally, the communication apparatus 3300 shown in FIG. 33 may further include a storage module (not shown in FIG. 33). The storage module stores a program or instructions. When the processing module 3301 executes the program or the instructions, the communication apparatus 3300 is enabled to perform a function of the second node in the communication method shown in FIG. 25.

For technical effects of the communication apparatus 3300, refer to technical effects of the communication method shown in FIG. 25. Details are not described herein again.

An embodiment of this application provides a communication system. The system includes the one or more first nodes and one or more second nodes.

An embodiment of this application provides a computer-readable storage medium, including computer instructions. When the computer instructions are run on a computer, the computer is enabled to perform the communication method in the foregoing method embodiments.

An embodiment of this application provides a computer program product, including a computer program or instructions. When the computer program or instructions are run on a computer, the computer is enabled to perform the communication method in the foregoing method embodiments.

It should be understood that, the processor in the embodiments of this application may be a central processing unit (CPU), or may be another general-purpose processor, a digital signal processor (DSP), an application-specific integrated circuit (ASIC), a field-programmable gate array (FPGA), or another programmable logic device, a discrete gate or a transistor logic device, a discrete hardware component, or the like. The general-purpose processor may be a microprocessor, or the processor may be any conventional processor or the like.

It should be further understood that the memory in the embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of random access memories (random access memories, RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by software, hardware (for example, a circuit), firmware, or any combination thereof. When the software is used to implement the embodiments, all or some of the foregoing embodiments may be implemented in a form of a computer program product. The computer program product includes one or more computer instructions or computer programs. When the computer instructions or the computer programs are loaded and executed on a computer, the processes or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: only A exists, both A and B exist, and only B exists. A and B may be singular or plural. In addition, the character "/" in this specification usually represents an "or" relationship between the associated objects, or may represent an "and/or" relationship. For details, refer to foregoing and following descriptions for understanding.

In this application, "at least one" refers to one or more, and "a plurality of" refers to two or more. "At least one of the following items (pieces)" or a similar expression thereof means any combination of the items, including any combination of one item (piece) or a plurality of items (pieces). For example, at least one of a, b, or c may represent: a, b, c, a and b, a and c, b and c, or a, b, and c, where a, b, and c may be singular or plural.

It should be understood that sequence numbers of the foregoing processes do not mean execution sequences in various embodiments of this application. The execution sequences of the processes should be determined by functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such an implementation goes beyond the scope of this application.

A person skilled in the art may clearly understand that, for the purpose of convenient and brief description, for detailed working processes of the foregoing system, apparatuses, and units, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division during actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
generating, by a first node, a physical layer protocol data unit (PPDU), wherein the PPDU comprises redundancy version (RV) indication information and one or more retransmitted media access control protocol data units (MPDUs), and the RV indication information is used to indicate RVs of the one or more retransmitted MPDUs; and sending, by the first node, the PPDU;
wherein the RV indication information comprises a quantity of retransmitted MPDUs in the PPDU.

2. The communication method according to claim 1, wherein different retransmitted MPDUs corresponding to different RVs are transmitted in a preset RV order, and different retransmitted MPDUs corresponding to a same RV are transmitted in an order in which the MPDUs are originally transmitted.

3. The communication method according to claim 2, wherein the quantity of retransmitted MPDUs is a total quantity of retransmitted MPDUs in the PPDU and wherein the RV indication information further comprises an RV of each retransmitted MPDU.

4. The communication method according to claim 2, wherein the RVs of the one or more retransmitted MPDUs belong to a preset RV set, the preset RV set comprises one or more types of preset RVs, and the quantity of retransmitted MPDUs comprises a quantity of retransmitted MPDUs corresponding to each type of preset RV in the PPDU.

5. The communication method according to claim 4, wherein the quantity of retransmitted MPDUs is a total quantity of retransmitted MPDUs in the PPDU.

6. The communication method according to claim 2, wherein the RV indication information further comprises an RV in the PPDU and the quantity of retransmitted MPDUs comprises a quantity of retransmitted MPDUs corresponding to each type of RV.

7. The communication method according to claim 1, wherein the PPDU further comprises one or more newly transmitted MPDUs, and wherein when sending the PPDU by the first node, the one or more newly transmitted MPDUs are transmitted after the one or more retransmitted MPDUs.

8. A communication method, comprising:
sending, by a second node, acknowledgment information to a first node, wherein the acknowledgment information indicates a media access control protocol data unit (MPDU) incorrectly transmitted in previous transmission;

receiving, by the second node, a physical layer protocol data unit (PPDU) that is sent by the first node and that comprises the MPDU, wherein a transmission order of the MPDU is determined by a quantity of transmissions of the MPDU and a transmission order in which the MPDU is originally transmitted; and parsing, by the second node, the MPDU.

9. The communication method according to claim 8, wherein the MPDU comprises a first MPDU and a second MPDU, and the first MPDU is transmitted before the second MPDU in the previous transmission; and that a transmission order of the MPDU is determined by a quantity of transmissions of the MPDU and a historical transmission order of the MPDU comprises:

if a quantity of transmissions of the first MPDU does not reach a maximum quantity of transmissions, the first MPDU is transmitted before the second MPDU in current transmission; or if a quantity of transmissions of the first MPDU reaches a maximum quantity of transmissions, and a quantity of transmissions of the second MPDU does not reach the maximum quantity of transmissions, the first MPDU is transmitted after the second MPDU in current transmission.

10. The communication method according to claim 9, wherein the PPDU further comprises default retransmission indication information, and the default retransmission indication information is used to indicate that the transmission order of the MPDU is determined by the quantity of transmissions of the MPDU and the historical transmission order of the MPDU.

11. The communication method according to claim 9, wherein the PPDU further comprises a retransmission sequence number of the MPDU or an indication of successful reception of the acknowledgment information, and the retransmission sequence number is a sequence number determined according to a sequence number update rule based on a sequence number used by the MPDU in the previous transmission.

12. A communication apparatus, comprising a processor and a transceiver, wherein the transceiver is configured to:

send acknowledgment information to a first node, wherein the acknowledgment information indicates a media access control protocol data unit (MPDU) incorrectly transmitted in previous transmission;

receive a physical layer protocol data unit (PPDU), wherein the PPDU comprises redundancy version (RV) indication information and one or more retransmitted media access control protocol data units (MPDUs), and the RV indication information is used to indicate RVs of the one or more retransmitted MPDUs and comprises a quantity of retransmitted MPDUs in the PPDU; and the processor is configured to parse the one or more retransmitted MPDUs based on the RV indication information.

13. The communication apparatus according to claim 12, wherein different retransmitted MPDUs corresponding to different RVs are transmitted in a preset RV order, and different retransmitted MPDUs corresponding to a same RV are transmitted in an order in which the different retransmitted MPDUs are originally transmitted.

14. The communication apparatus according to claim 13, wherein the quantity of retransmitted MPDUs is a total quantity of retransmitted MPDUs in the PPDU and the RV indication information further comprises an RV of each retransmitted MPDU.

15. The communication apparatus according to claim 13, wherein the RVs of the one or more retransmitted MPDUs belong to a preset RV set, the preset RV set comprises one or more types of preset RVs, and the quantity of retransmitted MPDUs comprises a quantity of retransmitted MPDUs corresponding to each type of preset RV in the PPDU.

16. The communication apparatus according to claim 15, wherein the quantity of retransmitted MPDUs is a total quantity of retransmitted MPDUs in the PPDU.

17. The communication apparatus according to claim 13, wherein the RV indication information further comprises an RV in the PPDU and the quantity of retransmitted MPDUS comprises a quantity of retransmitted MPDUs corresponding to each type of RV.

18. The communication apparatus according to claim 12, wherein the PPDU further comprises one or more newly transmitted MPDUs.

* * * * *